US012572415B2

(12) United States Patent
Choi et al.

(10) Patent No.: US 12,572,415 B2
(45) Date of Patent: Mar. 10, 2026

(54) SEMICONDUCTOR MEMORY DEVICES WITH ERROR CORRECTION

(71) Applicant: SAMSUNG ELECTRONICS CO., LTD., Suwon-si (KR)

(72) Inventors: Seonghyeog Choi, Suwon-si (KR); Jiho Kim, Suwon-si (KR); Changkyu Seol, Suwon-si (KR); Yuseok Song, Suwon-si (KR); Daewook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/657,360

(22) Filed: May 7, 2024

(65) Prior Publication Data

US 2025/0130891 A1    Apr. 24, 2025

(30) Foreign Application Priority Data

Oct. 18, 2023    (KR) ........................ 10-2023-0139296

(51) Int. Cl.
*G06F 11/10* (2006.01)

(52) U.S. Cl.
CPC ...... *G06F 11/1044* (2013.01); *G06F 11/1096* (2013.01)

(58) Field of Classification Search
CPC ............. G06F 11/1044; G06F 11/1096; G06F 11/1048; G06F 11/102; G06F 11/1076; G06F 13/1668; G11C 29/42
See application file for complete search history.

(56) References Cited

U.S. PATENT DOCUMENTS

| | | | |
|---|---|---|---|
| 7,739,576 B2 | 6/2010 | Radke | |
| 8,055,976 B2 | 11/2011 | Kim et al. | |
| 8,250,439 B1 | 8/2012 | Gruner et al. | |
| 9,170,878 B2 | 10/2015 | Haywood et al. | |
| 9,934,143 B2 | 4/2018 | Bains et al. | |
| 11,068,347 B2 | 7/2021 | Kim et al. | |
| 2021/0294692 A1* | 9/2021 | Chen .................. | G06F 9/30189 |
| 2022/0043710 A1* | 2/2022 | Kang .................. | G06F 11/1076 |
| 2023/0106125 A1* | 4/2023 | Chung ................ | H03M 13/353 |
| | | | 714/764 |

* cited by examiner

*Primary Examiner* — Thien Nguyen
(74) *Attorney, Agent, or Firm* — Fish & Richardson P.C.

(57) ABSTRACT

A memory system includes a semiconductor memory device and a memory controller to control the semiconductor memory device. The semiconductor memory device includes a memory cell array that is divided into a plurality of sub array blocks arranged in a first direction and a second direction. The memory controller includes an error correction code (ECC) engine. The ECC engine, in a write operation, generates a parity data by performing an ECC encoding on a user data including a plurality of sub data units, generates a main data by interleaving the sub data units based on mapping information such that two sub data units to be stored in one row of a target sub array block are included in one symbol. The mapping information indicates a mapping relationship between the plurality of sub data units and rows of the target sub array block storing the plurality of sub data units.

20 Claims, 28 Drawing Sheets

MPIa

| BL(DQ0~DQ7) | WL |
|:---:|:---:|
| BL0 | WL0 |
| BL1 | WL1 |
| BL2 | WL2 |
| BL3 | WL3 |
| BL4 | WL0 |
| BL5 | WL1 |
| BL6 | WL2 |
| BL7 | WL3 |

MAPC

| | DQ0 ~DQ7 | | DQ0 ~DQ7 | | DQ0 ~DQ7 | | DQ0 ~DQ7 | |
|---|---|---|---|---|---|---|---|---|
| SWD | BL0 BL4 | SWD | BL1 BL5 | SWD | BL3 BL7 | SWD | BL2 BL6 | SWD |
| | DQ0 ~DQ7 | | DQ0 ~DQ7 | | DQ0 ~DQ7 | | DQ0 ~DQ7 | |

| | DQ0 | DQ1 | DQ2 | DQ3 | DQ4 | DQ5 | DQ6 | DQ7 |
|---|---|---|---|---|---|---|---|---|
| BL0 | ▨ | ▨ | ▨ | ▨ | ▨ | ▨ | ▨ | ▨ |
| BL1 | | | | | | | | |
| BL2 | | | | | | | | |
| BL3 | | | | | | | | |
| BL4 | ▨ | ▨ | ▨ | ▨ | ▨ | ▨ | ▨ | ▨ |
| BL5 | | | | | | | | |
| BL6 | | | | | | | | |
| BL7 | | | | | | | | |

☐ :NO ERROR

▨ :ERROR BY 511

PGM

PCM

<u>200a</u>

400

450

ECCa

FIG. 24

MPIb

| | |
|---|---|
| SCG11 | SDU0 |
| SCG12 | SDU4 |
| SCG21 | SDU1 |
| SCG22 | SDU5 |
| SCG31 | SDU2 |
| SCG32 | SDU6 |
| SCG41 | SDU3 |
| SCG42 | SDU7 |

SEMICONDUCTOR MEMORY DEVICES WITH ERROR CORRECTION

CROSS-REFERENCE TO RELATED APPLICATION

This application claims priority under 35 U.S.C. § 119 to Korean Patent Application No. 10-2023-0139296, filed on Oct. 18, 2023, the disclosure of which is incorporated by reference herein in its entirety.

TECHNICAL FIELD

Aspects of the present disclosure relate to semiconductor memory devices.

BACKGROUND

Semiconductor memory devices may be classified as non-volatile memory devices, such as flash memory devices, and volatile memory devices, such as dynamic random access memory (DRAM) devices. DRAM devices are often used for system memories due to their high speed operation and cost efficiency. Due to the continuing reduction in fabrication design rules of DRAM devices, bit errors of memory cells in DRAM devices may increase, and the yield of DRAM devices may decrease.

SUMMARY

Some implementations according to this disclosure provide memory systems and semiconductor memory devices capable of performing error correction with reduced complexity.

According to some implementations, a memory system includes a semiconductor memory device and a memory controller to control the semiconductor memory device. The semiconductor memory device includes a memory cell array that includes a plurality of memory cells connected to word-line and bit-lines, and is divided into a plurality of sub array blocks arranged in a first direction and a second direction crossing the first direction. The memory controller includes an error correction code (ECC) engine. The ECC engine, in a write operation, generates a parity data by performing an ECC encoding on a user data including a plurality of sub data units, each of which includes plurality of data bits, generates a main data by interleaving the plurality of sub data units based on mapping information such that two sub data units to be stored in one row of a target sub array block among the plurality of sub array blocks, among the plurality of sub data units are included in one symbol and transmits the main data and the parity data to the semiconductor memory device. The mapping information indicates a mapping relationship between the plurality of sub data units and rows of the target sub array block storing the plurality of sub data units.

According to some implementations, a memory system includes a semiconductor memory device and a memory controller to control the semiconductor memory device. The semiconductor memory device includes a memory cell array that includes a plurality of memory cells connected to word-line and bit-lines, and is divided into a plurality of sub array blocks arranged in a first direction and a second direction crossing the first direction. The memory controller includes an error correction code (ECC) engine. The ECC engine, in a write operation, generates a parity data by performing an ECC encoding on a user data including a plurality of sub data units, each of which includes a plurality of data bits, based on a selected ECC selected from a plurality of ECCs based on mapping information, and transmits the parity data and a main data corresponding to the user data to the semiconductor memory device. The mapping information indicates a mapping relationship between the plurality of sub data units and rows of the target sub array block storing the plurality of sub data units. The selected ECC is configured such that two sub data units to be stored in one row of the target sub array block among the plurality of sub array blocks, among the plurality of sub data units are included in one symbol.

According to some implementations, a semiconductor memory device includes a memory cell array, an on-die error correction code (ECC) engine, an input/output (I/O) gating circuit and a control logic circuit. The memory cell array includes a plurality of memory cells connected to word-line and bit-lines and the memory cell array is divided into a plurality of sub array blocks arranged in a first direction and a second direction crossing the first direction. The on-die ECC engine generates a parity data based on a main data including a plurality of sub data units, each of which includes a plurality of data bits, by using an ECC represented by a generation matrix in a write operation. The I/O gating circuit is coupled between the memory cell array and the on-die ECC engine and stores the main data and the parity data in the memory cell array. The control logic circuit controls the on-die ECC engine and the I/O gating circuit. The on-die ECC engine generates the parity data by performing a first interleaved matrix-multiplication on the plurality of sub data units and sub code groups of a plurality of code groups based on mapping information such that two sub data units to be stored in one row of a target sub array block among the plurality of sub array blocks, among the plurality of sub data units are included in one symbol. The mapping information indicates a mapping relationship between the plurality of sub data units and the sub code groups.

According to some implementations, the ECC engine in the memory controller may perform symbol ECC decoding to correct error bits in one symbol when a defect occur in a sub word-line or sub word-line driver by interleaving a plurality of sub data units such that two sub data units to be stored in one row of a target sub array block among a plurality of sub array blocks, among the plurality of sub data units are included in one symbol based on mapping information indicating a core structure of the semiconductor memory device. Therefore, the ECC engine may enhance error correction capability of a symbol ECC and may prevent degradation of reliability due to detects of the sub word-line or the sub word-line driver.

BRIEF DESCRIPTION OF THE DRAWINGS

Features of the present disclosure will become more apparent by describing in detail examples thereof with reference to the accompanying drawings.

3

Figure 5:
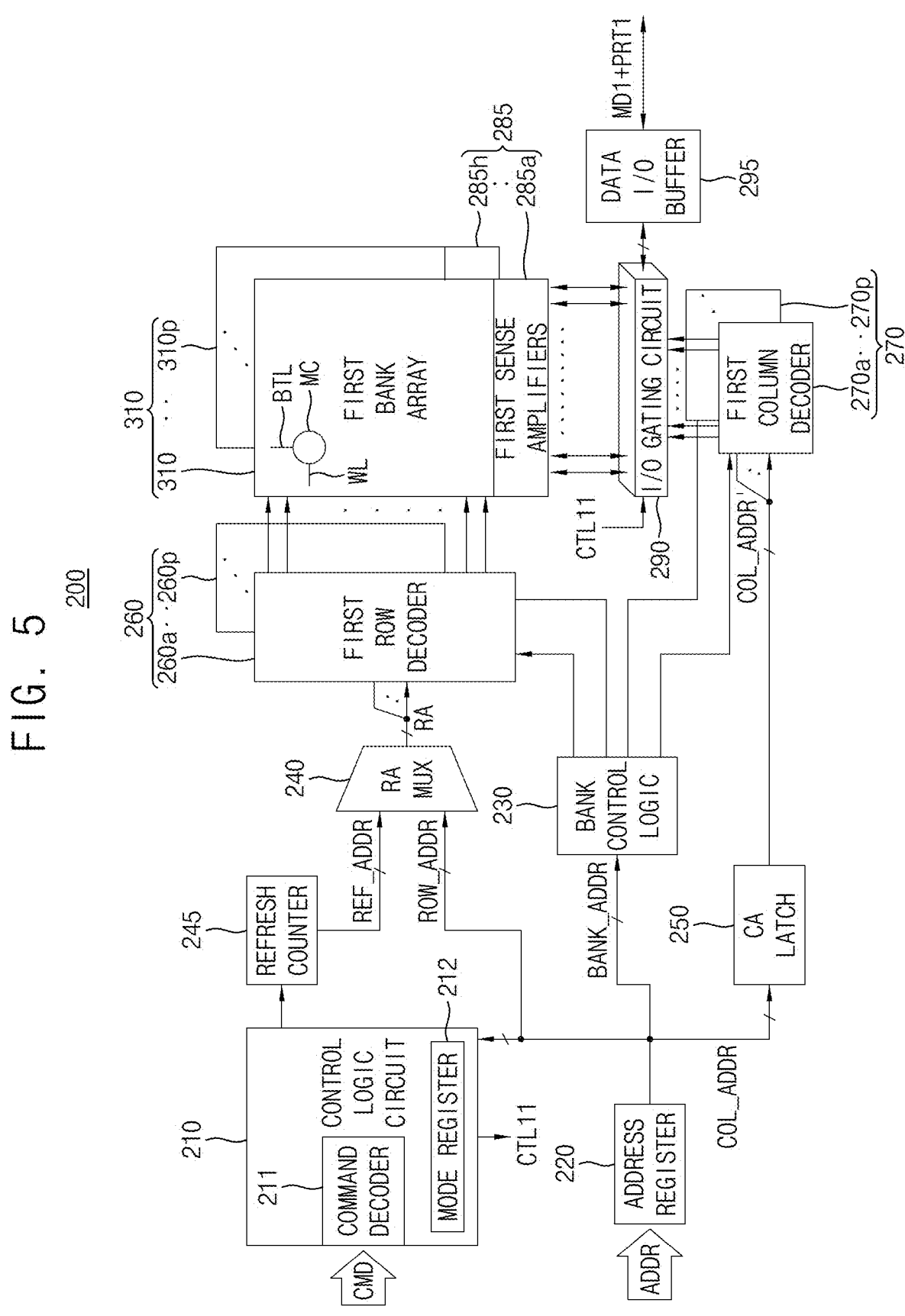

FIG. 5 is a block diagram illustrating an example of a semiconductor memory device according to some implementations.

Figure 6:
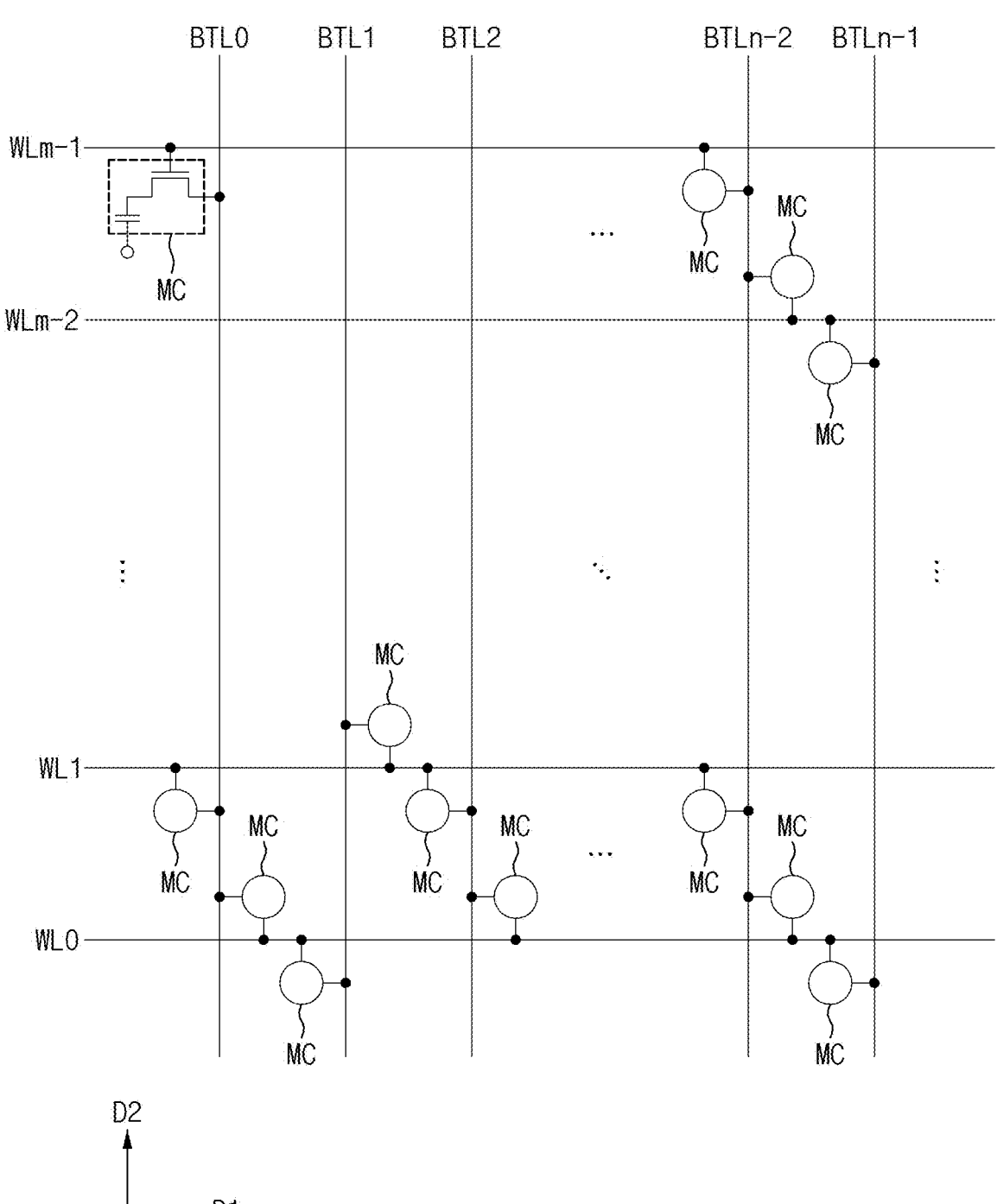

FIG. 6 illustrates an example of a bank array in a semiconductor memory device according to some implementations.

FIG. 7 is an example of a table illustrating mapping information according to some implementations.

Figure 8:
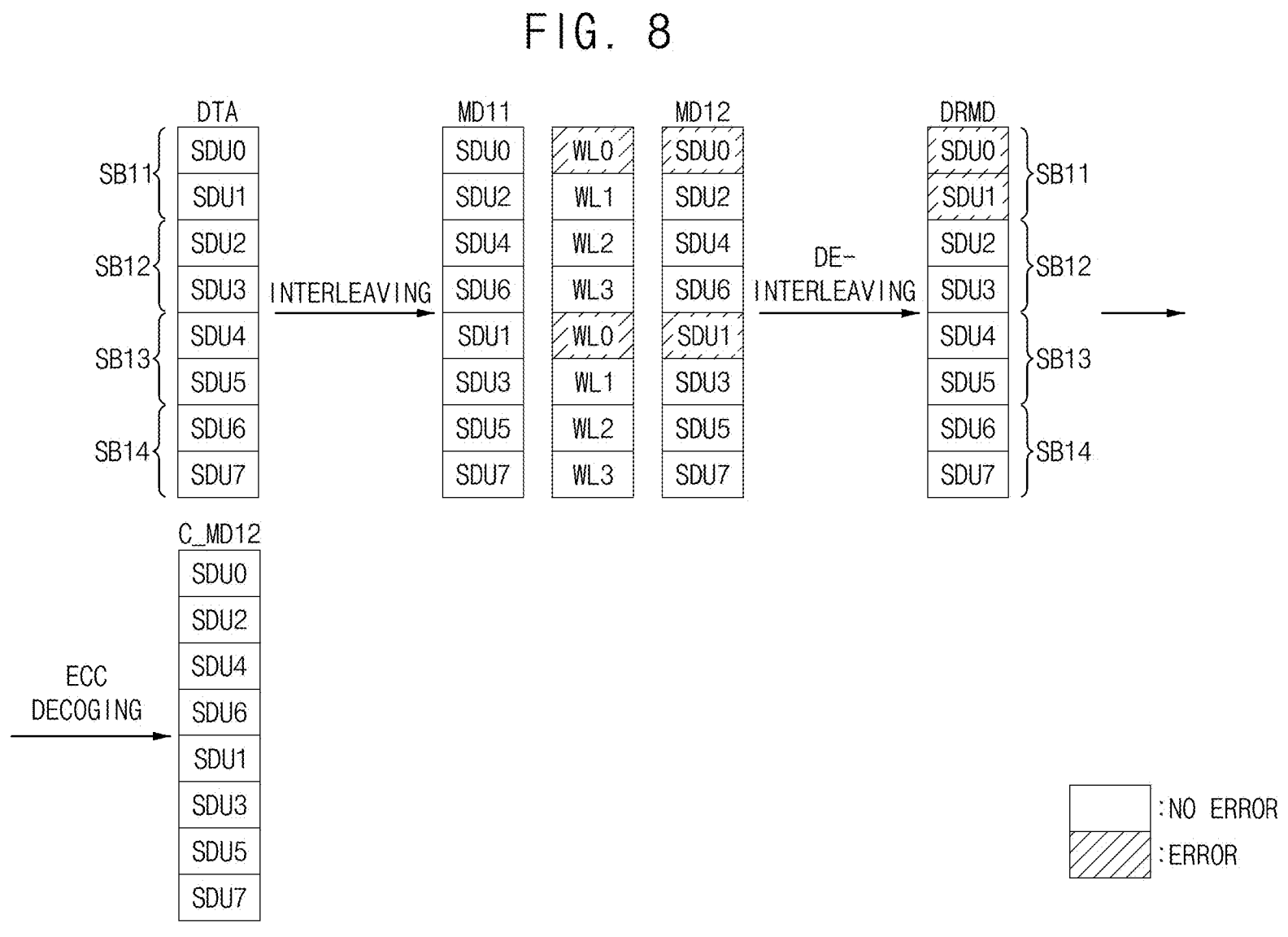

FIG. 8 illustrates an example operation of an ECC engine according to some implementations.

Figure 9:
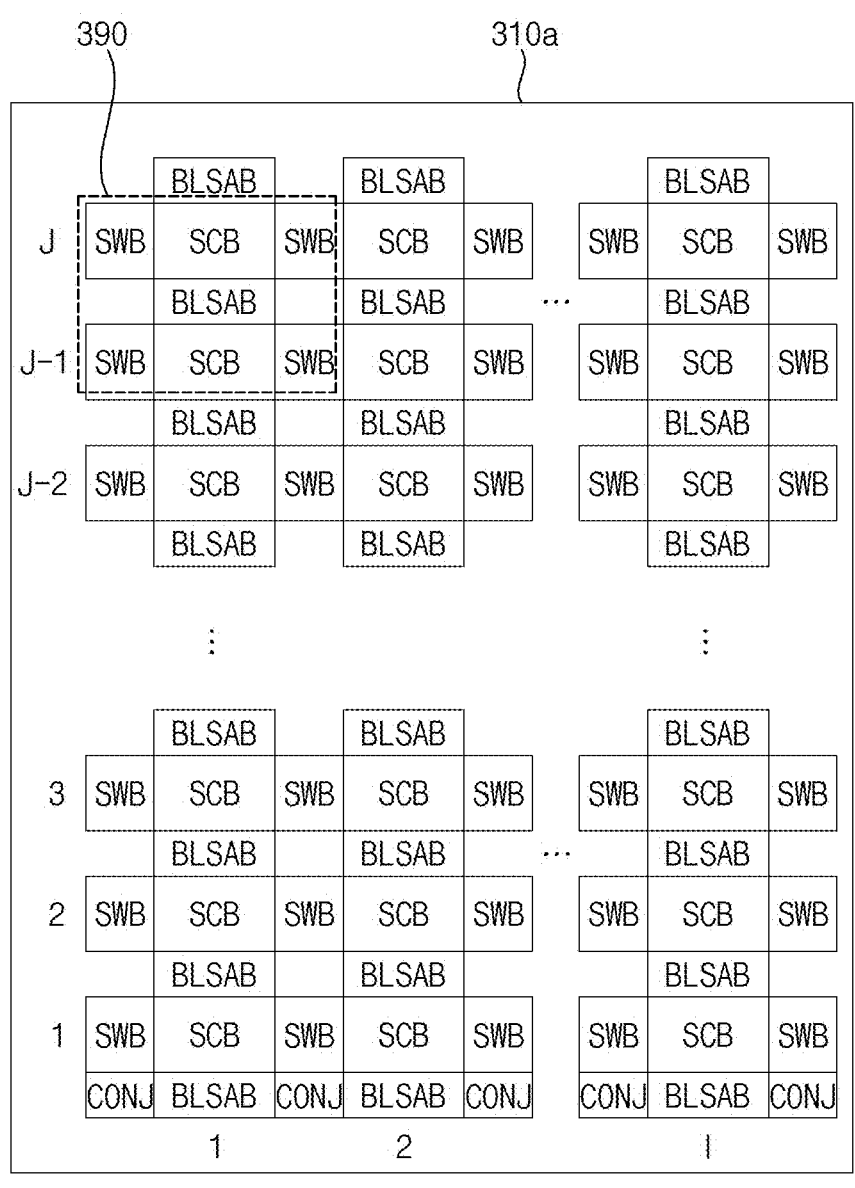
Figure 9:
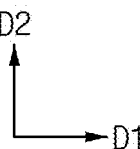

FIG. 9 illustrates an example of a bank array according to some implementations.

Figure 10:
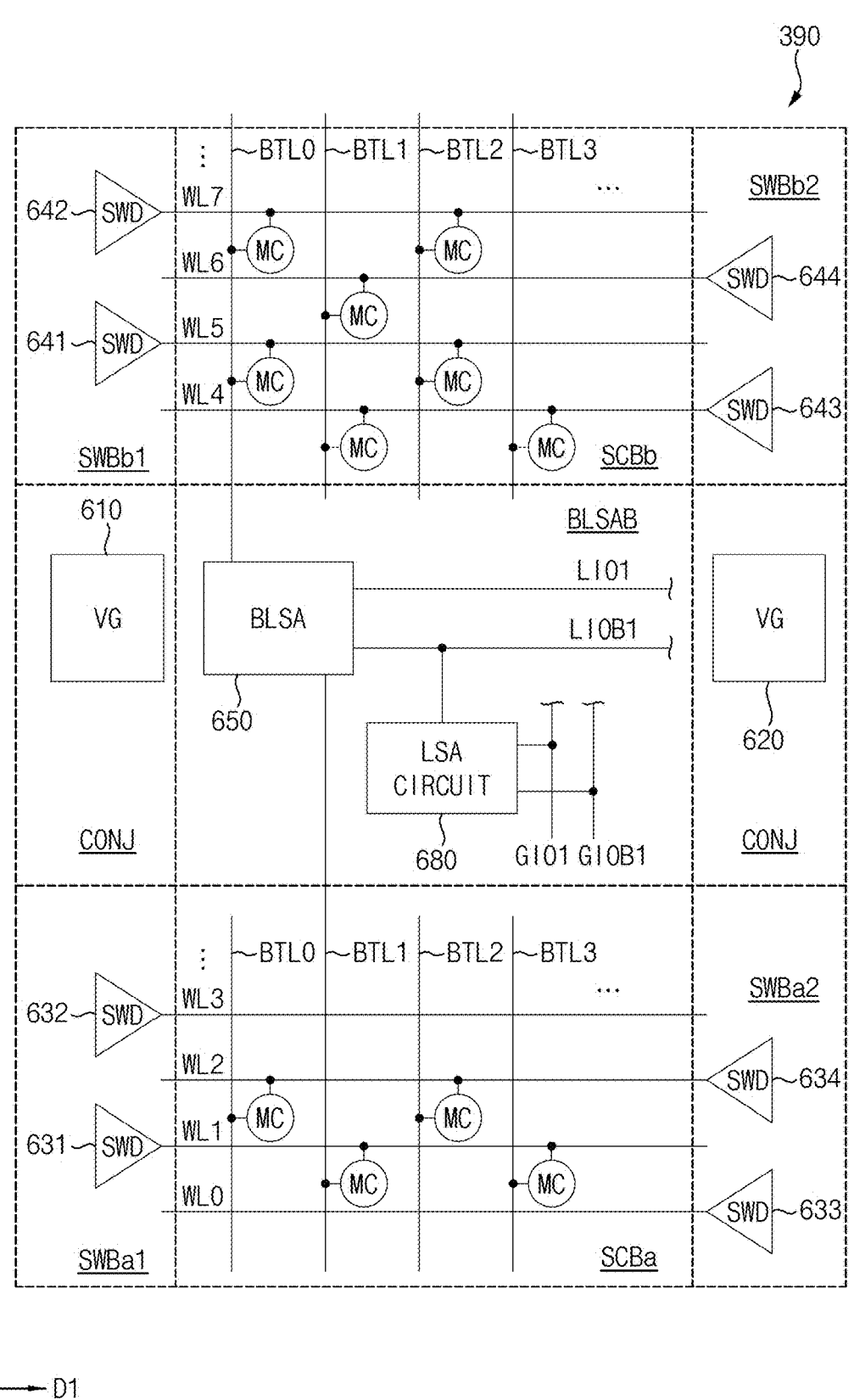

FIG. 10 illustrates a portion of a bank array according to some implementations.

Figure 11:
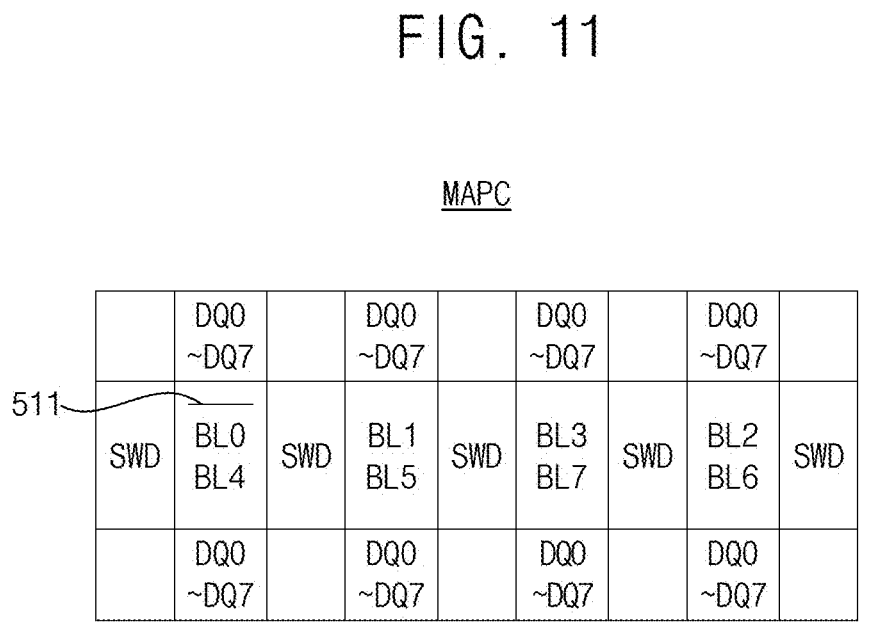

FIG. 11 illustrates mapping configuration between data bits input through I/O pads during burst lengths and sub array block in which the data bits are stored.

FIG. 12 illustrates errors that may occur due to defects.

Figure 13:
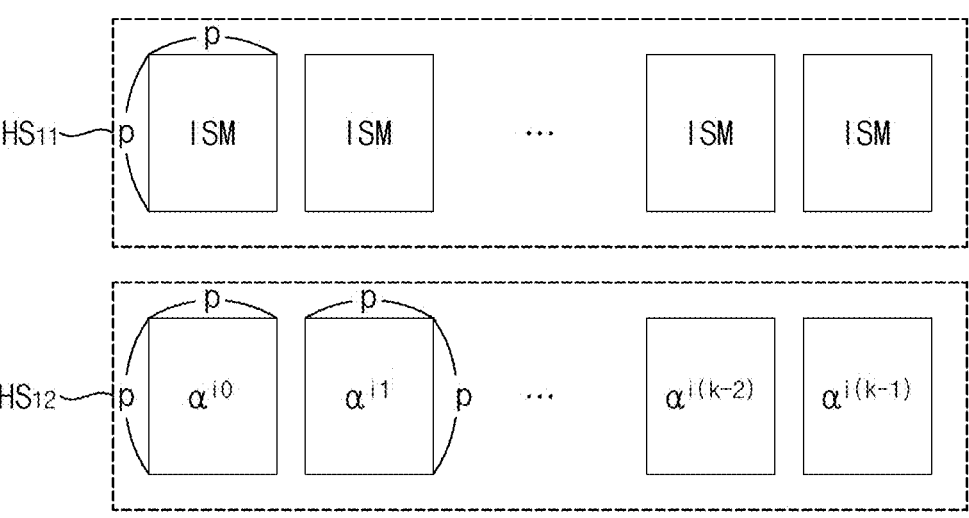

FIG. 13 illustrates an example of a parity generation matrix stored in a memory in an ECC engine.

Figure 14:
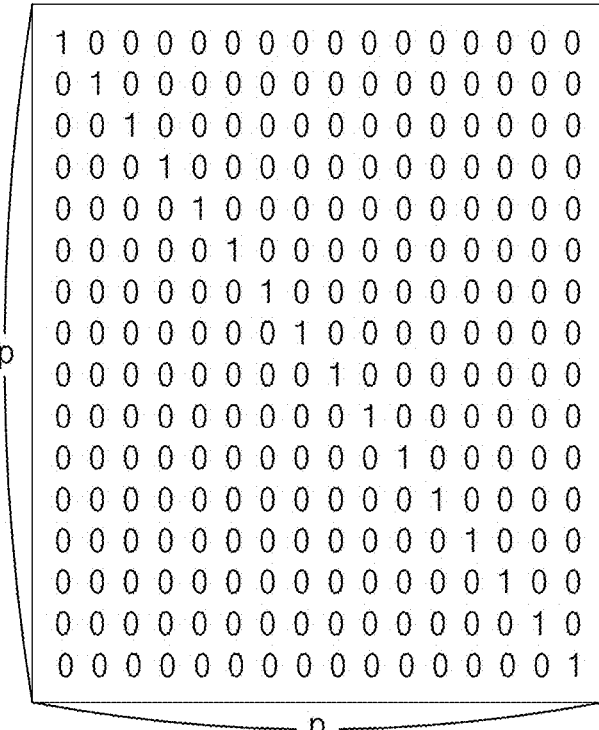

FIG. 14 illustrates an example of a unit sub matrix.

Figure 15:
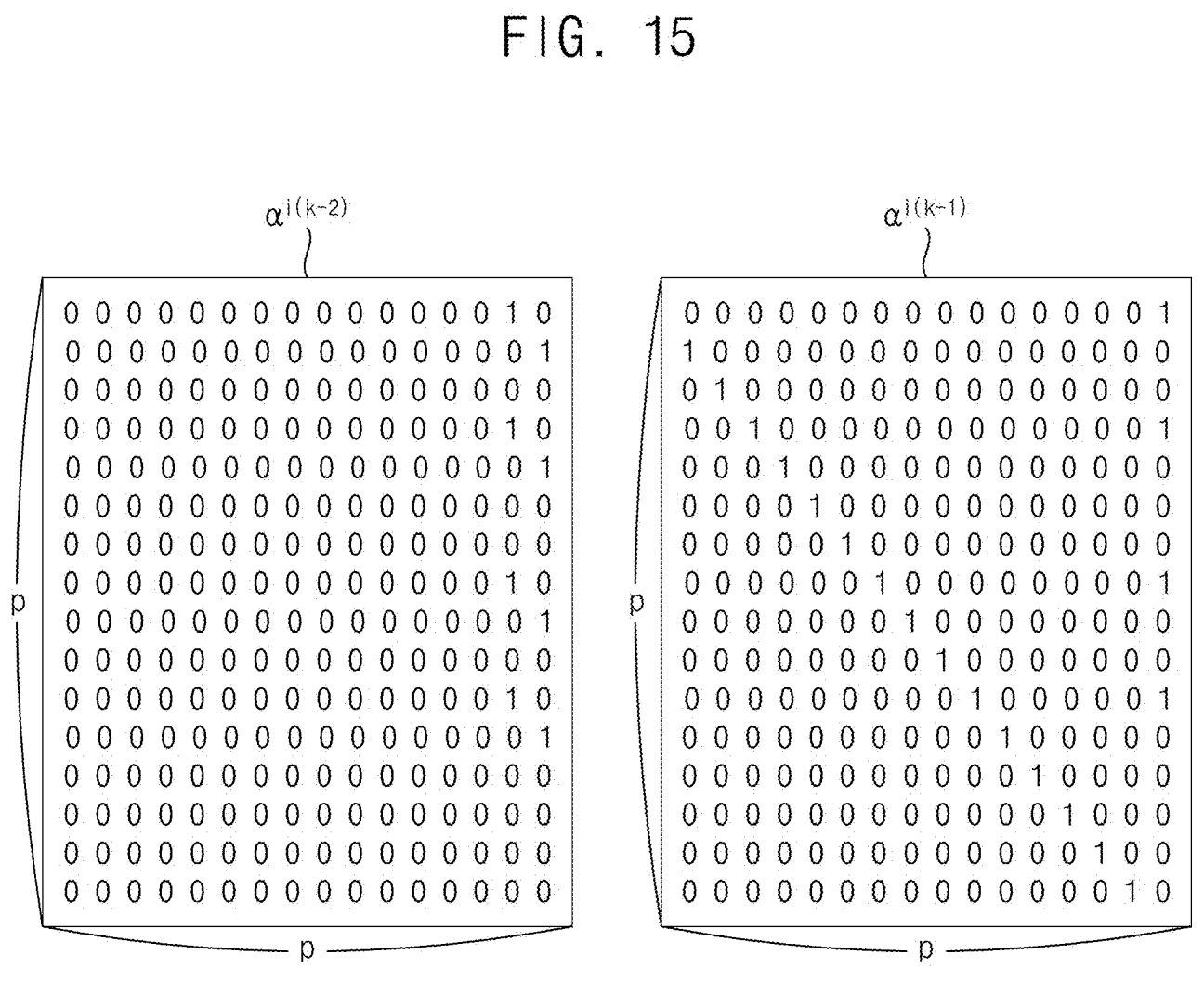

FIG. 15 illustrates examples of alpha matrixes.

Figure 16:
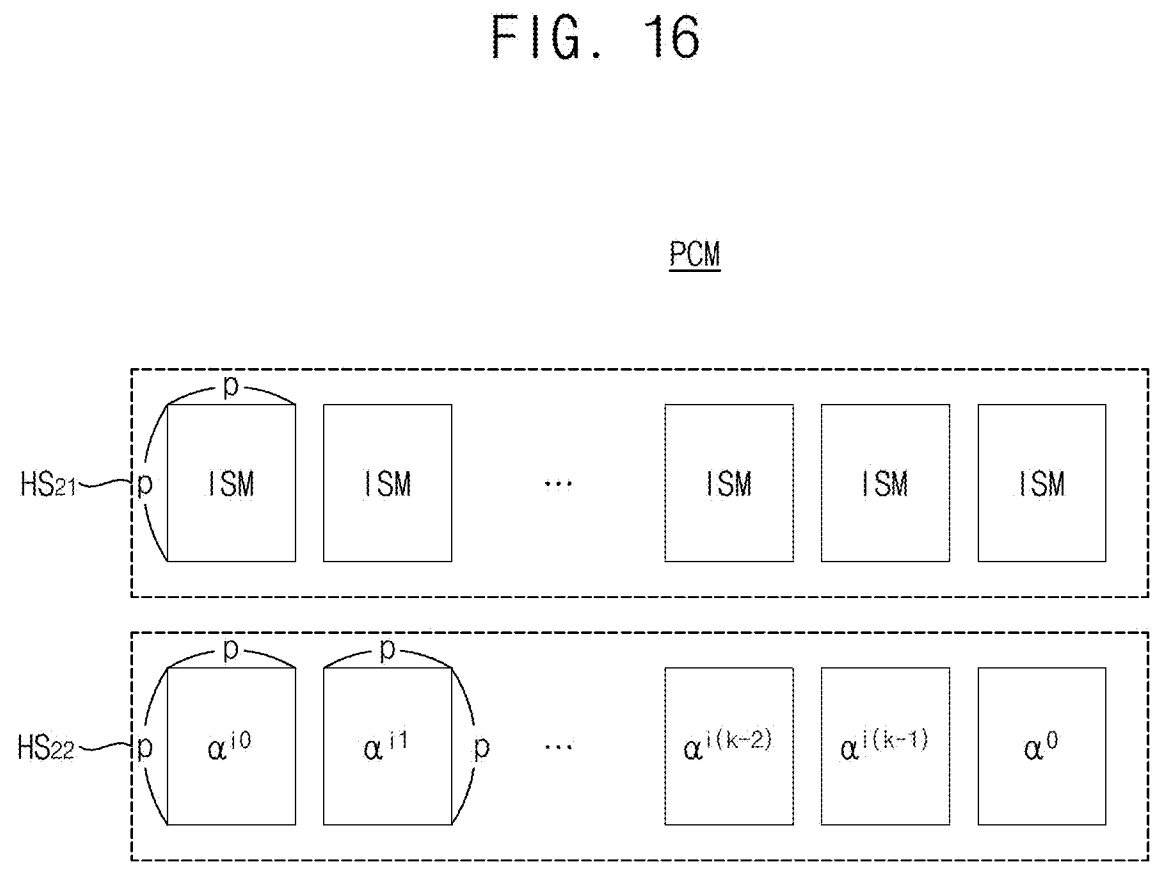

FIG. 16 illustrates an example of a parity check matrix stored in a memory in an ECC engine.

Figure 17:
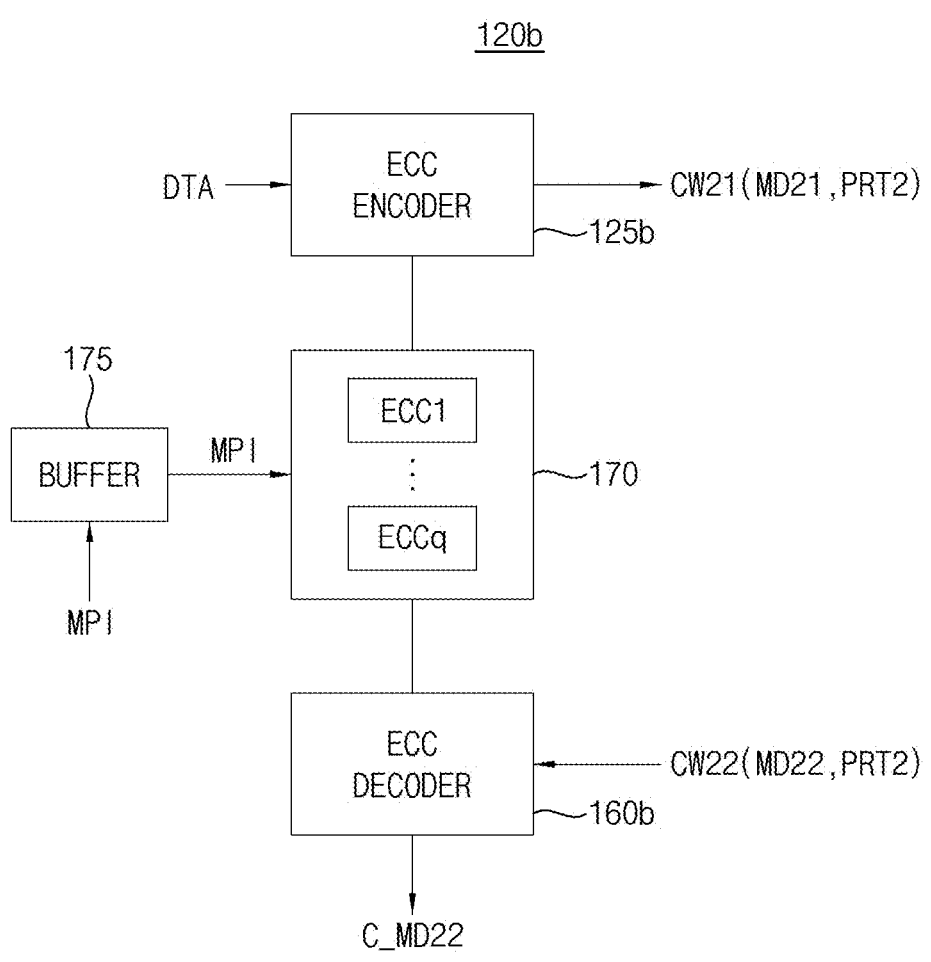

FIG. 17 is a block diagram illustrating an example of an ECC engine according to some implementations.

Figure 18:
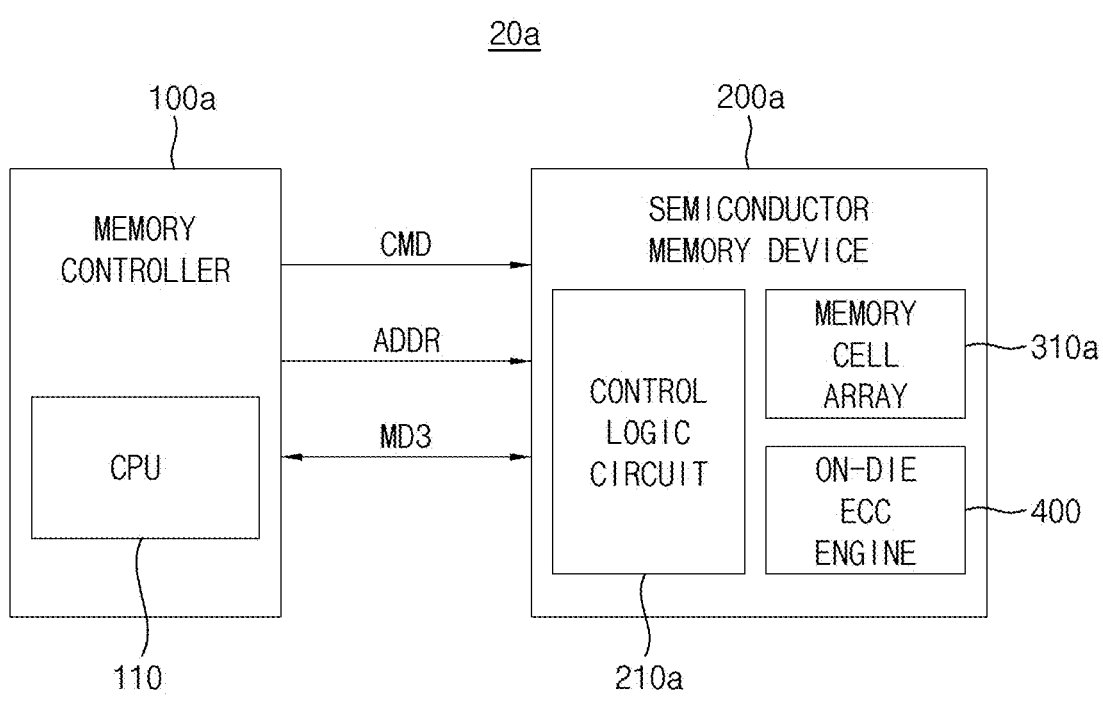

FIG. 18 is a block diagram illustrating a memory system according to some implementations.

Figure 19:
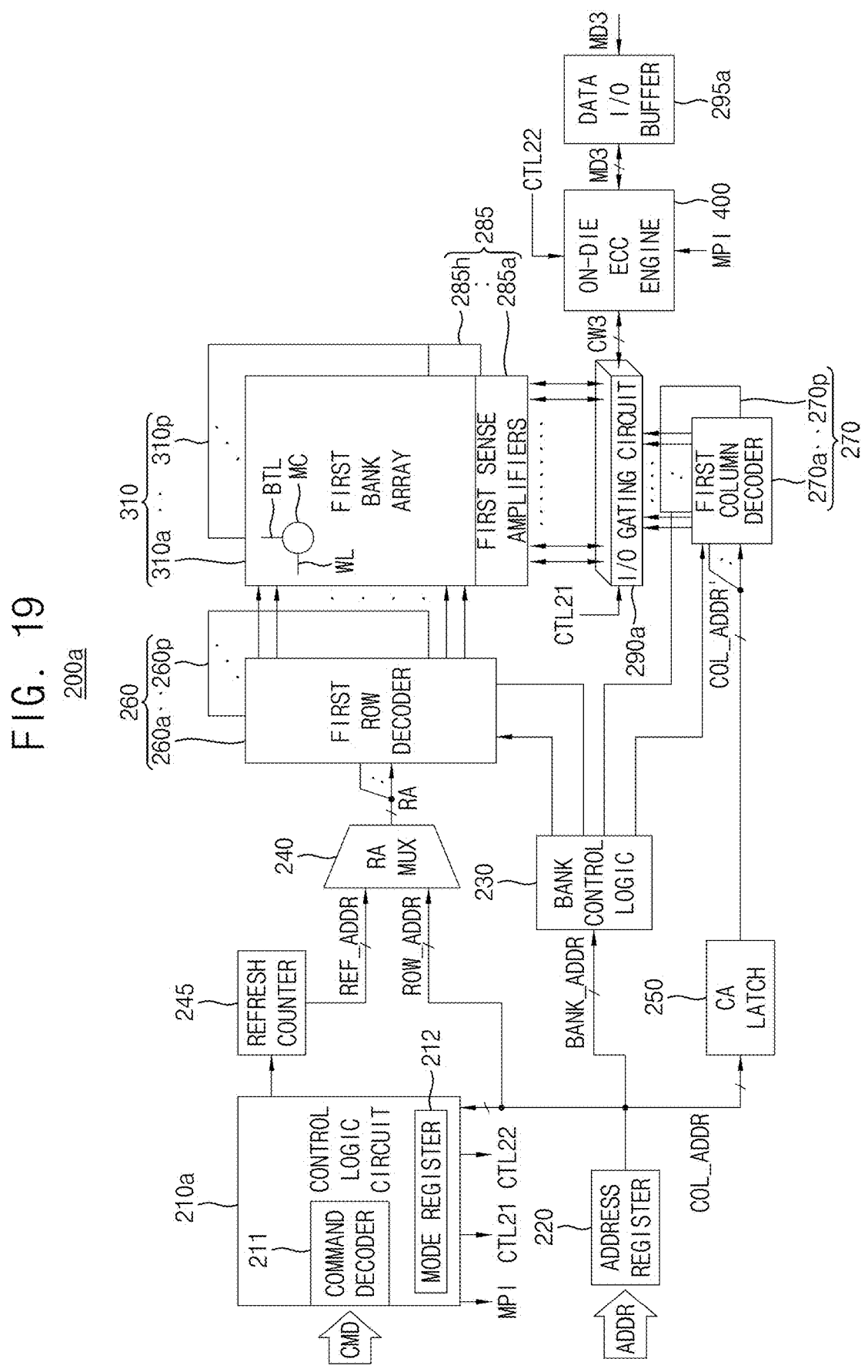

FIG. 19 is a block diagram illustrating a semiconductor memory device according to some implementations.

Figure 20:
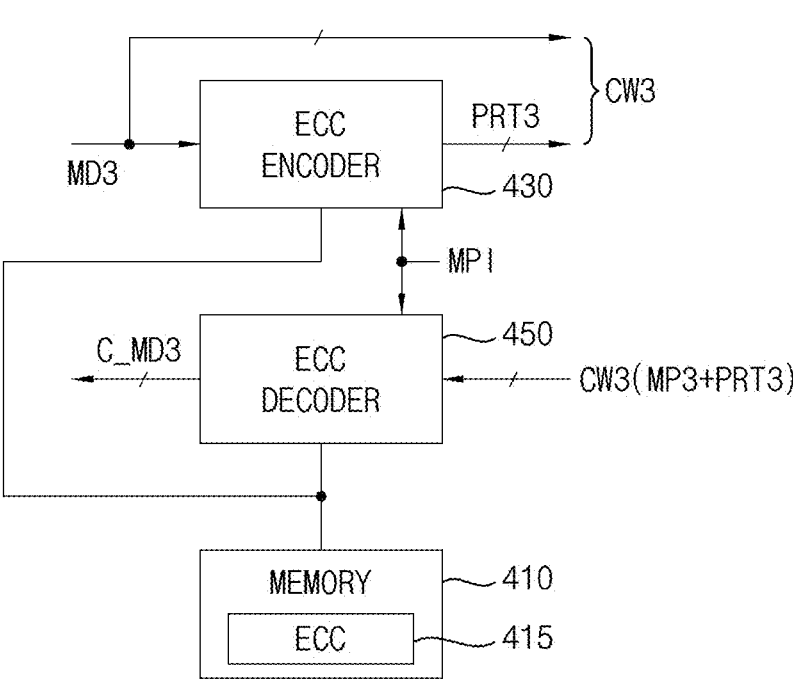

FIG. 20 is a block diagram illustrating an example of an on-die ECC engine according to some implementations.

Figure 21:
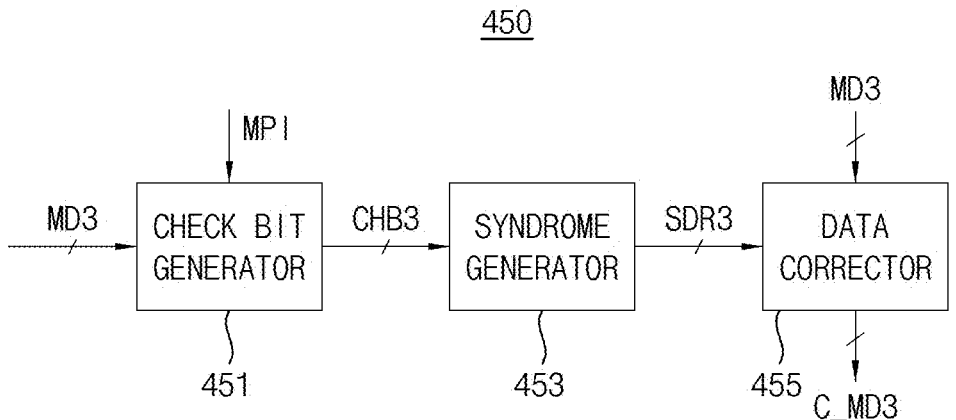

FIG. 21 is a block diagram illustrating an ECC decoder in an on-die ECC engine according to some implementations.

Figure 22:
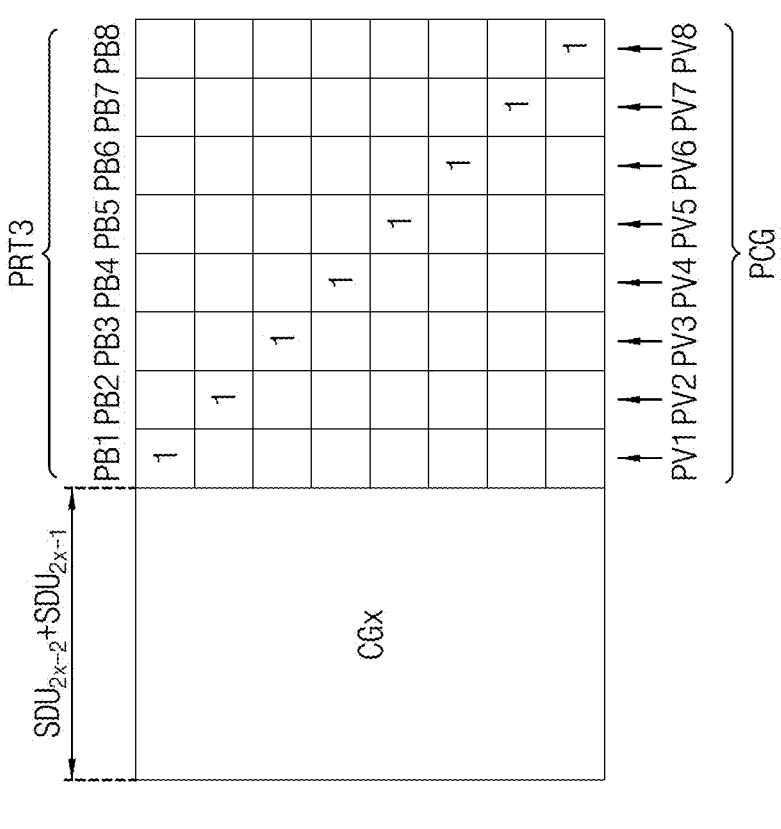
Figure 22:
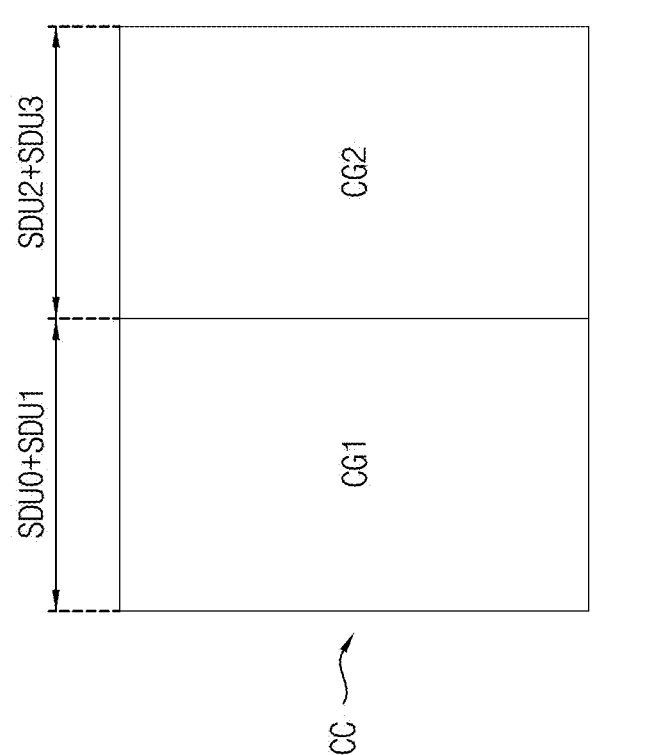

FIG. 22 illustrates relationships of an ECC and parity bits used in an on-die ECC engine according to some implementations.

Figure 23:
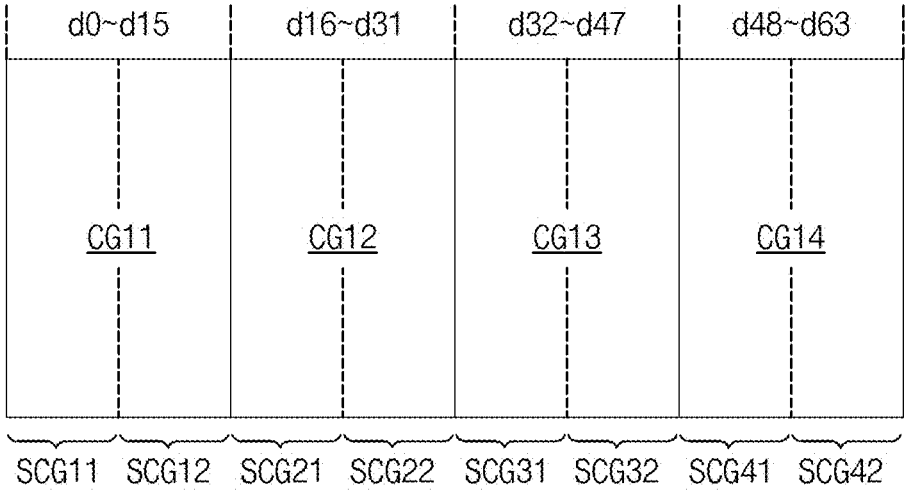

FIG. 23 illustrates an example of an ECC according to some implementations.

FIG. 24 illustrates an example of mapping information according to some implementations.

Figure 25:
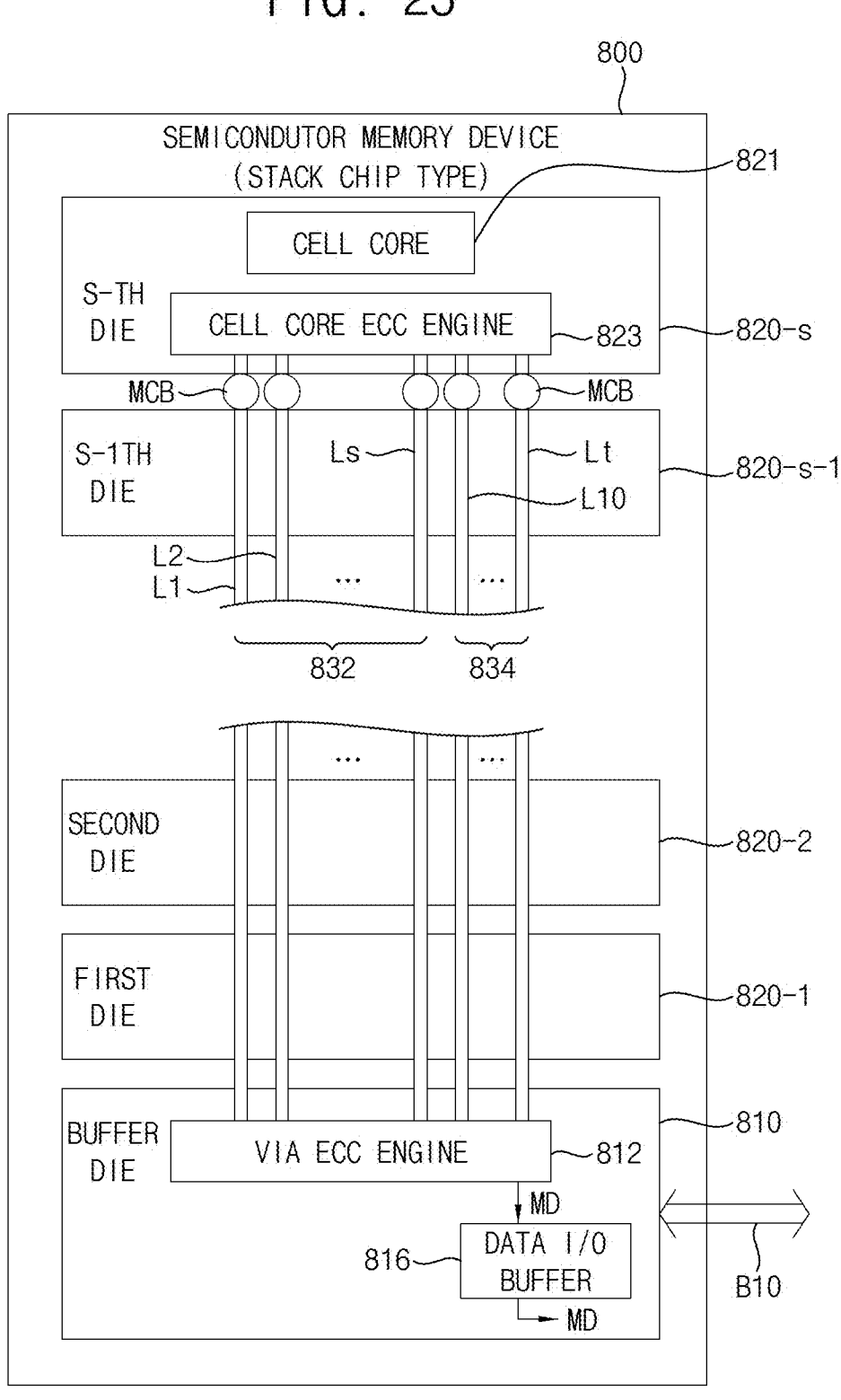

FIG. 25 is a block diagram illustrating a semiconductor memory device according to some implementations.

Figure 26:
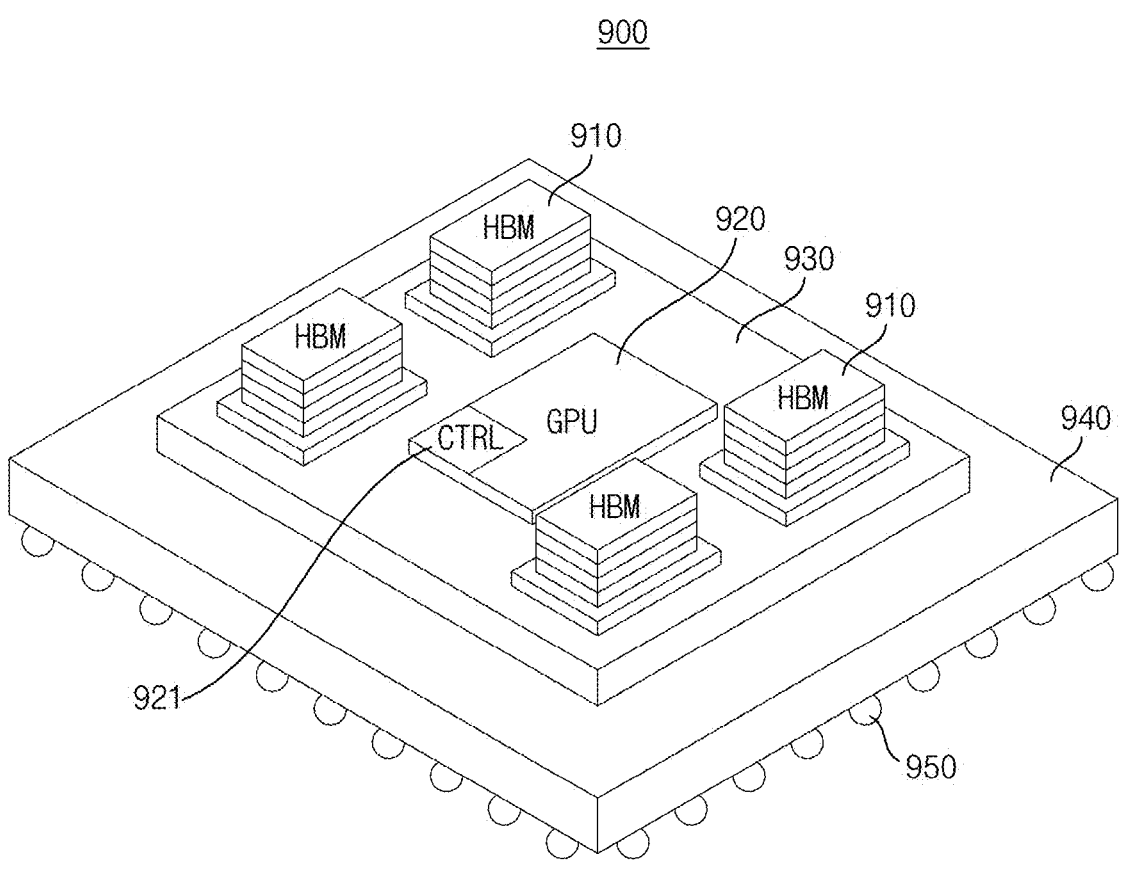

FIG. 26 is a configuration diagram illustrating a semiconductor package including the stacked memory device according to some implementations.

Figure 27:
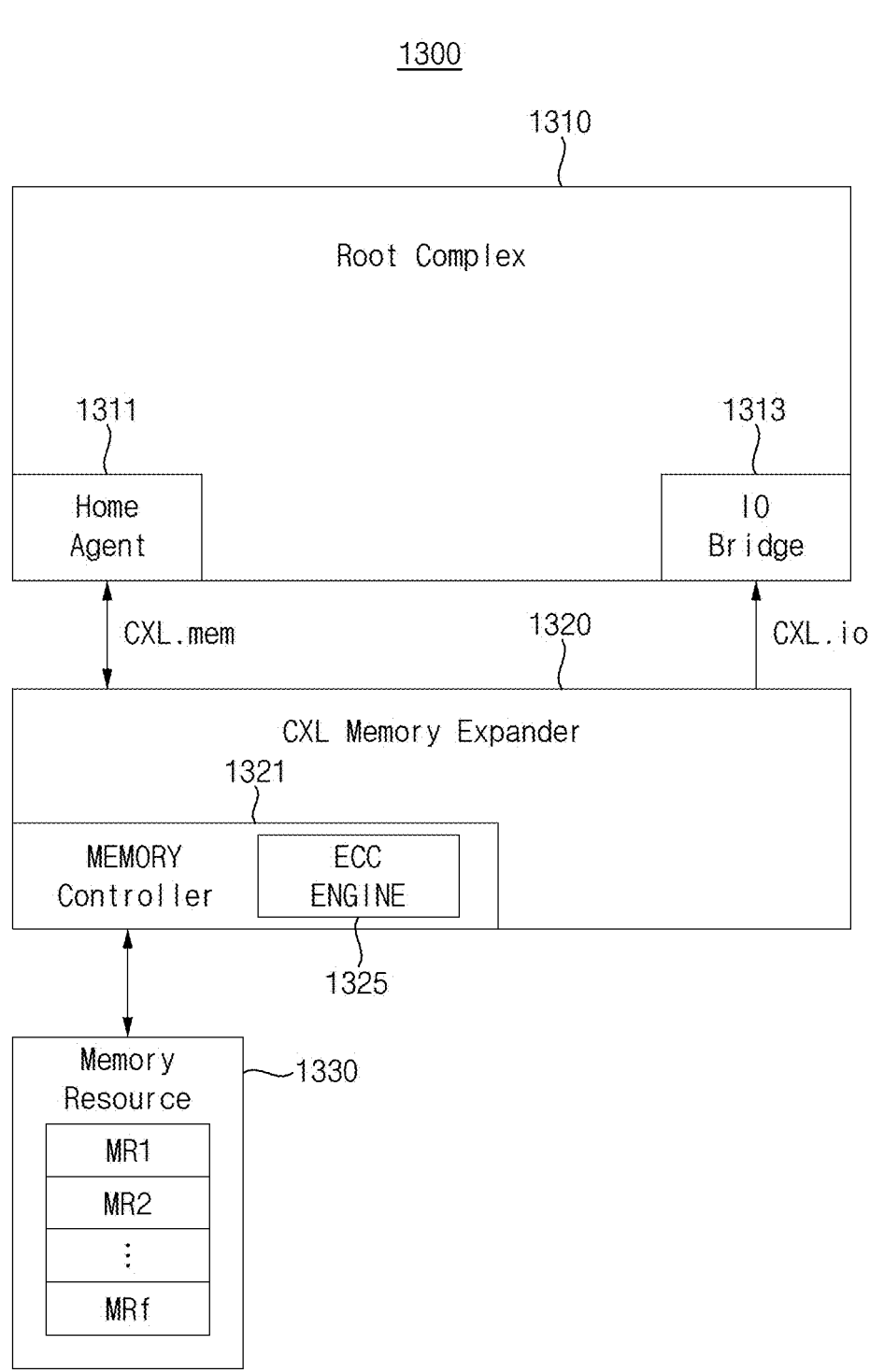

FIG. 27 is an example of a computing system including a Type 3 memory system.

Figure 28:
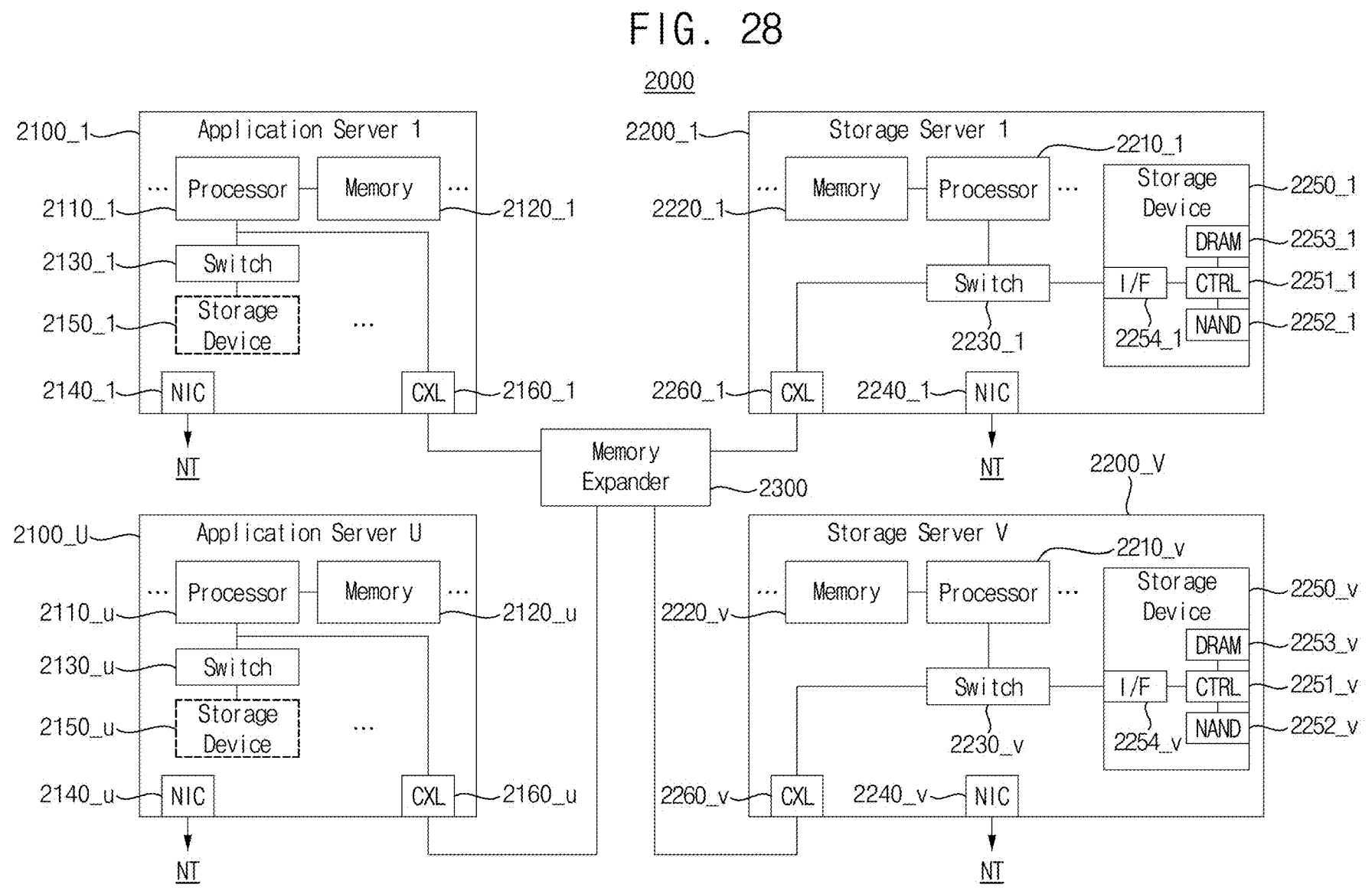

FIG. 28 is a block diagram illustrating an example of a data center according to some implementations.

DETAILED DESCRIPTION

Examples according to the present disclosure will be described more fully hereinafter with reference to the accompanying drawings. Like reference numerals may refer to like elements throughout the accompanying drawings.

Figure 1:
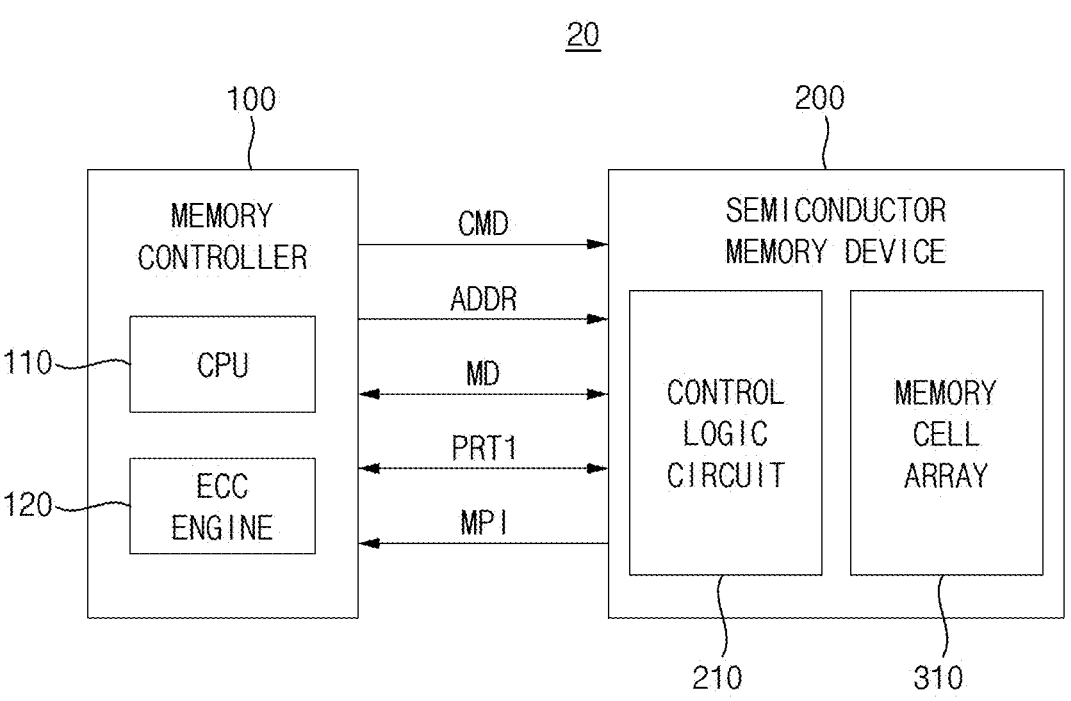
FIG. 1 is a block diagram illustrating a memory system according to some implementations.

FIG. 1 is a block diagram illustrating a memory system according to some implementations.

Referring to FIG. 1, a memory system 20 may include a memory controller 100 (e.g., an external memory controller) and a semiconductor memory device 200.

The memory controller 100 may control the overall operation of the memory system 20. The memory controller 100 may control the overall data exchange between an external host and the semiconductor memory device 200. For example, the memory controller 100 may write data in the semiconductor memory device 200 or read data from the semiconductor memory device 200 in response to requests from the host.

In addition, the memory controller 100 may issue operation commands to the semiconductor memory device 200 for controlling the semiconductor memory device 200.

In some implementations, the semiconductor memory device 200 may be a memory device including a plurality of dynamic (volatile) memory cells such as a dynamic random access memory (DRAM), double data rate 5 (DDR5) synchronous DRAM (SDRAM), DDR6 SDRAM or a stacked memory device such as a high bandwidth memory (HBM).

The memory controller 100 may transmit a clock signal CLK, a command CMD, and an address (signal) ADDR to the semiconductor memory device 200 and may exchange main data MD with the semiconductor memory device 200.

The semiconductor memory device 200 may include a control logic circuit 210 and a memory cell array 310.

The memory controller 100 may include a central processing unit (CPU) 110 and an error correction code (ECC) engine 120.

The CPU 110 may control an overall operation of the memory controller 100.

The ECC engine 120, in a write operation, may generate parity data PRT1 by performing an ECC encoding on user data including a plurality of sub data units, each of which includes a plurality of data bits, and may generate a main data MD by interleaving the plurality of sub data units based on mapping information MPI, such that two sub data units to be stored in one row of a target sub array block in the memory cell array 310 among the plurality of sub array blocks, among the plurality of sub data units, are included in one symbol, and may transmit the main data and the parity data to the semiconductor memory device 200. The mapping information MPI may indicate a mapping relationship between the plurality of sub data units and rows of the target sub array block storing the plurality of sub data units.

The ECC engine 120, in a read operation, may receive the main data MD and the parity data PRT1 from the semiconductor memory device 200, may generate an intermediate main data by de-interleaving the main data based on the mapping information MPI, and may correct at least one error in the intermediate main data on a per-symbol basis by performing an ECC decoding on the intermediate main data using the parity data PRT1.

The first bank array 310*a* may store the main data MD and the parity data PRT1. The memory cell array 310 may be is divided into a plurality of sub array blocks arranged in a first direction and a second direction crossing the first direction.

The control logic circuit 210 may control an accessing of the memory cell array 310 based on the command CMD and the address ADDR.

The semiconductor memory device 200 may perform a burst operation. Herein, the burst operation may refer to an operation of writing or reading a large amount of data by sequentially increasing or decreasing an initial address provided from the memory controller 100. A basic unit of the burst operation may be referred to a burst length BL. In some implementations, the burst length BL refers to the number of operations of continuously reading or writing data by sequentially increasing or decreasing an initial address.

Each of the plurality of the sub data units may correspond to the burst length BL, and the burst length BL may indicate an amount of data that is input/output at one time between the memory controller 100 and the semiconductor memory device 200.

The semiconductor memory device 200 may provide the mapping information MPI to the memory controller 100.

Figure 2:
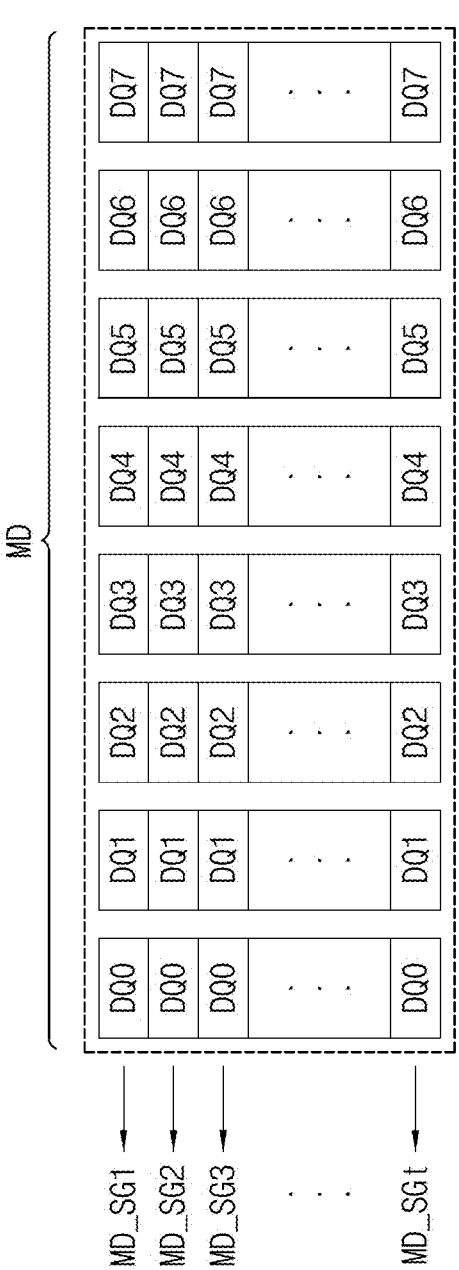
FIG. 2 illustrates a main data corresponding to a plurality of burst lengths according to some implementations.

FIG. 2 illustrates a main data corresponding to the plurality of burst lengths in the memory system of FIG. 1 according to some implementations.

Referring to FIG. 2, the main data MD corresponding to the plurality of burst lengths are input to/output from the semiconductor memory device 200. The main data MD includes data segments MD_SG1-MD_SGt (t is a natural number equal to or greater than 8) each corresponding to each of the plurality of burst lengths. The burst length is assumed to be 8 in FIG. 2. Each of the data segments MD_SG1-MD_SGt may include data bits that are input/output through input/output pads DQ0, DQ1, DQ2, DQ3, DQ4, DQ5, DQ6 and DQ7. The main data MD corresponding to the plurality of burst lengths may be stored in the memory cell array 310 of the semiconductor memory device 200.

Figure 3A:
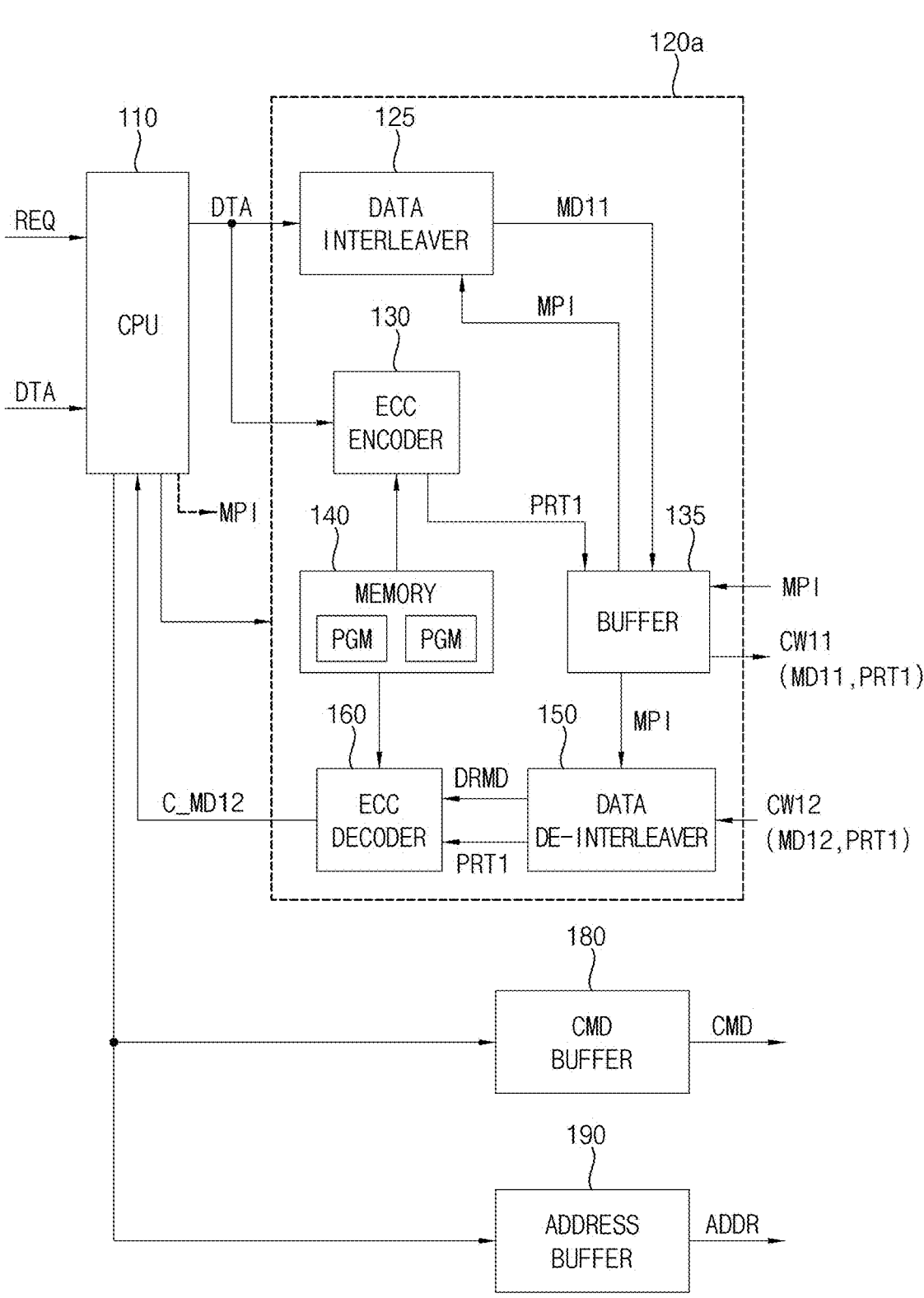
FIG. 3A is a block diagram illustrating an example of a memory controller according to some implementations.

FIG. 3A is a block diagram illustrating an example of the memory controller, for example, the memory controller of FIG. 1 according to some implementations.

Referring to FIG. 3A, the memory controller 100 may include the CPU 110, an ECC engine 120a, a command CMD buffer 180, and an address buffer 190. The ECC engine 120a may include a data interleaver 125, an ECC encoder 130, a buffer 135, a memory 140, a data de-interleaver 150 and an ECC decoder 160.

The CPU 110 may receive a request REQ and a user data DTA from the host, and may provide the user data DTA to the data interleaver 125 and the ECC encoder 130.

The data interleaver 125 may generate a main data MD11 by interleaving the plurality of sub data units based on the mapping information MPI such that two sub data units to be stored in one row of a target sub array block in the memory cell array 310 among the plurality of sub array blocks, among the plurality of sub data units, are included in one symbol, and may store the main data MD11 in the buffer 135.

The ECC encoder 130 may generate the parity data PRT1 by performing an ECC encoding on the user data DTA using a parity generation matrix PGM stored in the memory 140 and may store the parity data PRT1 in the buffer 135.

The buffer 135 may provide the main data MD11 and the parity data PRT1 to the semiconductor memory device 200 as a codeword CW11, may receive the mapping information MPI from the semiconductor memory device 200 during a power-up sequence, and may provide the mapping information MPI to the data interleaver 125 and the data de-interleaver 150.

The data de-interleaver 150, in a read operation, may receive a codeword CW12 including a main data MD12 and the parity data PRT1 from the semiconductor memory device 200, may generate an intermediate main data DRMD by de-interleaving the main data MD12 based on the mapping information MPI and may provide the intermediate main data DRMD and the parity data PRT1 to the ECC decoder 160.

The ECC decoder 160 may correct at least one error in the intermediate main data DRMD on a per-symbol basis by performing an ECC decoding on the intermediate main data DRMD using the parity data PRT1 and a parity check matrix PCM stored in the memory 140 and may provide a corrected main data C_MD12 to the CPU 110.

The command buffer 180 may store the command CMD corresponding to the request REQ and may transmit the command CMD to the semiconductor memory device 200 under control of the CPU 110. The address buffer 190 may store the address ADDR and may transmit the address ADDR to the semiconductor memory device 200 under control of the CPU 110.

Figure 3B:
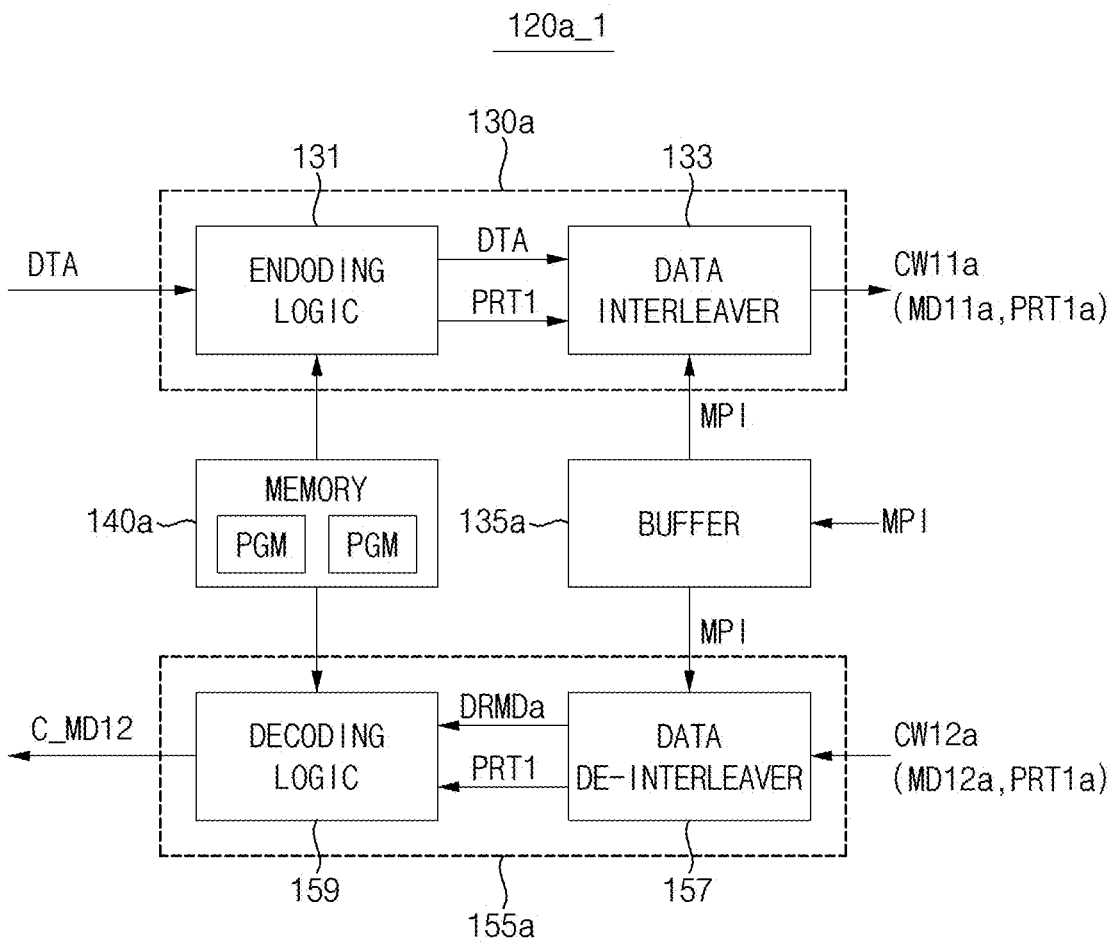
FIG. 3B is a block diagram illustrating an example of an ECC engine according to some implementations.

FIG. 3B is a block diagram illustrating an example of an ECC engine, for example, an ECC engine in the memory controller of FIG. 3A according to some implementations.

Referring to FIG. 3B, an ECC engine 120a_1 may include an ECC encoder 130a, a buffer 135a, a memory 140a and an ECC decoder 155a.

The ECC encoder 130a may include an encoding logic 131 and a data interleaver 133. The ECC decoder 155a may include a data de-interleaver 157 and a decoding logic 159.

The buffer 135a may receive the mapping information MPI from the semiconductor memory device 200 or the CPU 110 during a power-up sequence and may provide the mapping information MPI to the data interleaver 133 and the data de-interleaver 157.

The memory 140a may store the parity generation matrix PGM and the parity check matrix PCM.

The encoding logic, in a write operation, may generate the parity data PRT1 by performing the ECC encoding on the user data DTA using the parity generation matrix PGM stored in the memory 140a and may provide the user data DTA and the parity data PRT1 to the data interleaver 133.

The data interleaver 125 may generate a main data MD11a by interleaving the plurality of sub data units based on the mapping information MPI such that two sub data units to be stored in one row of a target sub array block in the memory cell array 310 among the plurality of sub array blocks, among the plurality of sub data units, are included in one symbol, may generate a interleaved parity data PRT1a by interleaving the parity data PRT1 based on the mapping information MPI, and may transmit an interleaved codeword CW11a including the main data MD11a and the interleaved parity data PRT1a to the semiconductor memory device 200.

Operations of the encoding logic 131 and the data interleaver 133 may correspond to an operation of the ECC encoder 130a.

The data de-interleaver 157, in a read operation, may receive an interleaved codeword CW12a including a main data MD12a and the interleaved parity data PRT1a from the semiconductor memory device 200, may generate an intermediate main data DRMDa and the parity data PRT1 by de-interleaving the main data MD12a and the interleaved parity data PRT1a, respectively, based on the mapping information MPI and may provide the intermediate main data DRMDa and the parity data PRT1 to the decoding logic 159.

The decoding logic 159 may correct at least one error in the intermediate main data DRMDa on a per-symbol basis by performing an ECC decoding on the intermediate main data DRMDa using the parity data PRT1 and the parity check matrix PCM stored in the memory 140a and may provide a corrected main data C_MD12 to the CPU 110.

Operations of the data de-interleaver 157 and the decoding logic 159 may correspond to an operation of the ECC decoder 155a.

Figure 4:
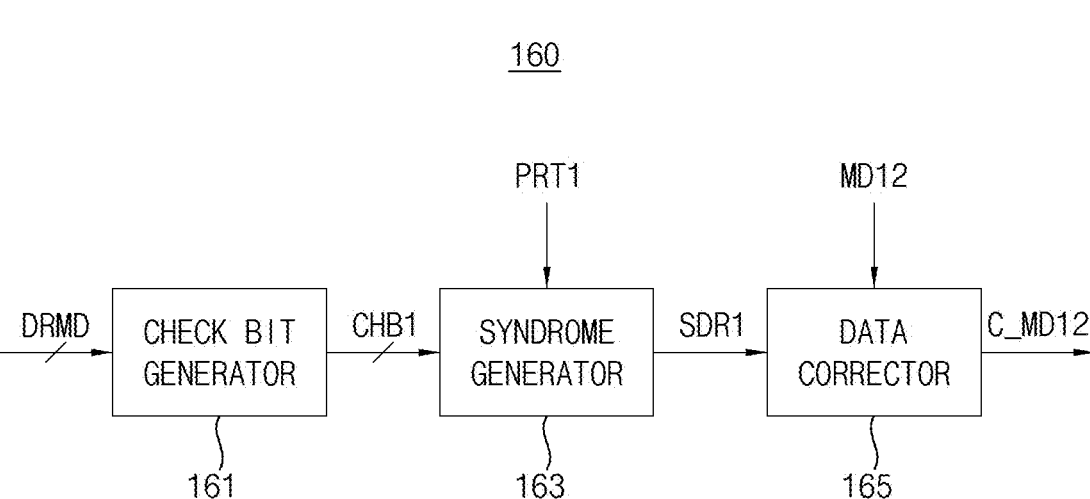
FIG. 4 is a block diagram illustrating an example of an ECC decoder according to some implementations.

FIG. 4 is a block diagram illustrating an example of an ECC decoder, for example, the ECC decoder in FIG. 3A, according to some implementations.

Referring to FIG. 4, the ECC decoder 160 may include a check bit generator 161, a syndrome generator 163, and a data corrector 165.

The check bit generator 161 may receive the intermediate main data DRMD, and may generate check bits CHB1 corresponding to the intermediate main data DRMD using the parity check matrix PCM.

The syndrome generator 163 may compare the parity data PRT1 and the check bits CHB1 on a symbol-by-symbol basis to generate a syndrome data SDR1 indicating whether the intermediate main data DRMD includes at least one error bit and indicating a position of the at least one error bit.

The data corrector 165 may receive the main data MD12 and may correct the error bits in the main data MD12 on a symbol-by-symbol basis based on the syndrome data SDR1 to output the corrected main data C_MD12.

FIG. 5 is a block diagram illustrating a semiconductor memory device, for example, the semiconductor memory device in FIG. 1, according to some implementations.

Referring to FIG. 5, the semiconductor memory device 200 may include the control logic circuit 210, an address register 220, a bank control logic 230, a row address multiplexer 240, a column address latch 250, a row decoder 260, a column decoder 270, the memory cell array 310, a sense amplifier unit 285, an input/output (I/O) gating circuit 290, a data input/output (I/O) buffer 295, and a refresh counter 245.

The memory cell array 310 may include first through sixteenth bank arrays 310a-310p. The row decoder 260 may include first through sixteenth row decoders 260a-260p respectively coupled to the first through sixteenth bank arrays 310a-310p. The column decoder 270 may include first through sixteenth column decoders 270a-270p respectively coupled to the first through sixteenth bank arrays 310a-310p. The sense amplifier unit 285 may include first through sixteenth sense amplifiers 285a-285p respectively coupled to the first through sixteenth bank arrays 310a-310p. The first through sixteenth bank arrays 310a-310p, the first through sixteenth row decoders 260a-260p, the first through sixteenth column decoders 270a-270p, and first through sixteenth sense amplifiers 285a-285p may form first through sixteenth banks. In addition, each of the first through sixteenth bank arrays 310a-310p may be divided into a plurality of sub array blocks arranged in a first direction and a second direction.

Each of the first through sixteenth bank arrays 310-310p may include a plurality of memory cells MC coupled to word-lines WL and bit-lines BTL.

Although the semiconductor memory device 200 is illustrated in FIG. 5 as including sixteen banks, the present disclosure are not limited thereto, and the semiconductor memory device 200 may include any number of banks.

The address register 220 may receive an address ADDR including a bank address BANK_ADDR, a row address ROW_ADDR and a column address COL_ADDR, and a command CMD from the memory controller 100.

The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through sixteenth row decoders 260a-260p corresponding to the bank address BANK_ADDR may be activated in response to the bank control signals, and one of the first through sixteenth column decoders 270a-270p corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output one of the row address ROW_ADDR or the refresh row address REF_ADDR as a row address RA. The row address RA that is output from the row address multiplexer 240 may be applied to the first through sixteenth row decoders 260a-260p.

The activated one of the first through sixteenth row decoders 260a-260p may decode the row address RA that is output from the row address multiplexer 240, and may activate a word-line corresponding to the row address RA. For example, the activated bank row decoder may apply a word-line driving voltage to the word-line corresponding to the row address RA.

The column address latch 250 may receive the column address COL_ADDR from the address register 220, and may temporarily store the received column address COL_ADDR. In some implementations, in a burst mode, the column address latch 250 may generate column addresses COL_ADDR' that increment from the received column address COL_ADDR. The column address latch 250 may apply the temporarily stored or generated column address COL_ADDR' to the first through sixteenth column decoders 270a-270p.

The activated one of the first through sixteenth column decoders 270a-270p may decode the column address COL_ADDR' that is output from the column address latch 250, and may control the I/O gating circuit 290 to output data corresponding to the column address COL_ADDR.

The I/O gating circuit 290 may include circuitry for gating input/output data. The I/O gating circuit 290 may further include read data latches for storing data that is output from the first through sixteenth bank arrays 310a-310p, and write drivers for writing data to the first through sixteenth bank arrays 310a-310p.

The main data MD and the parity data PRT1 to be read from one bank array of the first through sixteenth bank arrays 310a-310p may be sensed by a sense amplifier coupled to the one bank array from which the codeword is to be read, and may be stored in the read data latches. The main data MD and the parity data PRT1 stored in the read data latches may be provided to the memory controller 100 via the data I/O buffer 295.

The main data MD and the parity data PRT1 to be written in one bank array of the first through sixteenth bank arrays 310a-310p may be provided to the data I/O buffer 295 from the memory controller 100. The data I/O buffer 295 may provide the main data MD and the parity data PRT1 to the I/O gating circuit 290. The I/O gating circuit 290 may store the main data MD and the parity data PRT1 in a target memory region of the memory cell array 310 based on a control signal CTL11 from the control logic circuit 210.

The control logic circuit 210 may control operations of the semiconductor memory device 200. For example, the control logic circuit 210 may generate control signals for the semiconductor memory device 200 to perform a write operation or a read operation. The control logic circuit 210 may include a command decoder 211 that decodes the command CMD received from the memory controller 100, and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may generate the control signal CTL11.

The mapping information MPI may be set in the mode register 212 and the control logic circuit 210 may provide the mapping information MPI to the memory controller 100 during a power-up sequence of the semiconductor memory device 200.

FIG. 6 illustrates an example of a back array, for example, the first bank array in the semiconductor memory device of FIG. 5 according to some implementations.

Referring to FIG. 6, the first bank array 310a may include a plurality of word-lines WL0-WLm−1 (m is a natural number greater than two), a plurality of bit-lines BTL0-BTLn−1 (n is a natural number greater than two), and a plurality of memory cells MCs disposed at intersections between the word-lines WL0-WLm−1 and the bit-lines BTL0-BTLn−1. Each of the memory cells MCs may include a cell transistor coupled to each of the word-lines WL0-WLm−1 and each of the bit-lines BTL0-BTLn−1 and a cell capacitor coupled to the cell transistor. Each of the memory cells MCs may have a DRAM cell structure. Each of the word-lines WL0-WLm−1 extends in a first direction D1 and each of the bit-lines BTL1-BTLn−1 extends in a second direction D2 crossing the first direction D1.

The word-lines WL0-WLm−1 coupled to the plurality of memory cells MCs may be referred to as rows of the first bank array 310a and the bit-lines BTL0-BTLn−1 coupled to the plurality of memory cells MCs may be referred to as columns of the first bank array 310a.

FIG. 7 is an example of a table illustrating mapping information according to some implementations.

Referring to FIG. 7, mapping information MPIa may indicate a mapping relation between data bits (i.e., sub data unit) that are input/output at one time through data pads DQ0-DQ7 corresponding to the burst length BL and word-lines WL (i.e., rows or sub word-lines of the target sub array block storing the data bits). The data bits (i.e., sub data unit) that are input/output at one time through data pads DQ0-DQ7 corresponding to the burst length BL may be referred to as a sub data unit.

Data bits corresponding to a burst length BL0 and data bits corresponding to a burst length BL4 may be stored in memory cells coupled to a word-line WL0 of a sub array block (a first sub array block), data bits corresponding to a burst length BL1 and data bits corresponding to a burst length BL5 may be stored in memory cells coupled to a word-line WL1 of the first sub array block, data bits corresponding to a burst length BL2 and data bits corresponding to a burst length BL6 may be stored in memory cells coupled to a word-line WL2 of the first sub array block, and data bits corresponding to a burst length BL3 and data bits corresponding to a burst length BL7 may be stored in memory cells coupled to a word-line WL3 of the first sub array block.

FIG. 8 illustrates an example operation of an ECC engine, e.g., the ECC engine in FIG. 3A according to some implementations.

Referring to FIGS. 3A and 8, the user data DTA may include a plurality of sub data units SDU0, SDU1, SDU2, SDU3, SDU4, SDU5, SDU6 and SDU7, and each of the plurality of sub data units SDU0, SDU1, SDU2, SDU3, SDU4, SDU5, SDU6 and SDU7 may include a plurality of data bits. In addition, each of the plurality of sub data units SDU0, SDU1, SDU2, SDU3, SDU4, SDU5, SDU6 and SDU7 may correspond to a respective one of the burst lengths BL0, BL1, BL2, BL3, BL5, BL5, BL6 and BL7 in FIG. 7.

Two sub data units SDU0 and SDU1 may correspond to a symbol SB11, two sub data units SDU2 and SDU3 may correspond to a symbol SB12, two sub data units SDU4 and SDU5 may correspond to a symbol SB13, and two sub data units SDU6 and SDU7 may correspond to a symbol SB14.

The data interleaver 125 in FIG. 3A, in a write operation, may generate the main data MD11 by interleaving the plurality of sub data units SDU0, SDU1, SDU2, SDU3, SDU4, SDU5, SDU6 and SDU7 in the user data DTA based on the mapping information MPI such that two sub data units to be stored in one row (i.e. memory cells coupled to one word-line) of a target sub array block in the memory cell array 310 are included in one symbol. The sub data units SDU0 and SDU1 may be sequentially stored in a memory cell row (memory cells) coupled to the word-line WL0, the sub data units SDU2 and SDU3 may be sequentially stored in a memory cell row (memory cells) coupled to the word-line WL1, the sub data units SDU4 and SDU5 may be sequentially stored in a memory cell row (memory cells) coupled to the word-line WL2, and the sub data units SDU6 and SDU7 may be sequentially stored in a memory cell row (memory cells) coupled to the word-line WL3.

Two sub data units (for example, two sub data units SDU0 and SDU1) constituting one symbol may be stored in memory cells coupled to the first word-line WL1 driven by one sub word-line driver.

FIG. 8 assumes that defects (errors) occur in the memory cells coupled to the word-line WL0. Therefore, data bits of the sub data units SDU0 and SDU1 may include error bits.

The data de-interleaver 150 in FIG. 3A, in a read operation, may receive the main data MD12 including the plurality of sub data units SDU0, SDU2, SDU4, SDU6, SDU1, SDU3, SDU5 and SDU7, may generate the intermediate main data DRMD corresponding to the user data DTA by de-interleaving the plurality of sub data units SDU0, SDU2, SDU4, SDU6, SDU1, SDU3, SDU5 and SDU7 based on the mapping information MPI and may provide the intermediate main data DRMD to the ECC decoder 160.

The ECC decoder 160 may correct errors (e.g., error bits in the sub data units SDU0 and SDU1) in the intermediate main data DRMD on a per-symbol basis by performing an ECC decoding on the intermediate main data DRMD based on the parity data PRT1 and may provide the corrected main data C_MD12.

FIG. 9 illustrates an example of a bank array, e.g., the first bank array of FIG. 6, according to some implementations.

Referring to FIG. 9, in the first bank array 310a, I sub-array blocks SCB may be disposed in the first direction D1, and J sub-array blocks SCB may be disposed in the second direction D2 perpendicular to the first direction D1. I and J represent a number of the sub-array blocks SCB in the first direction D1 and the second direction D2, respectively, and are natural numbers greater than two.

I sub-array blocks SCB disposed in the first direction D1 in one row may be referred to as a row block. A plurality of bit-lines, a plurality of word-lines and a plurality of memory cells connected to the bit-lines and the word-lines are disposed in each of the sub-array blocks SCB.

I+1 sub word-line driver regions SWB may be disposed between the sub-array blocks SCB in the first direction D1 as well on each side of each of the sub-array blocks SCB in the first direction D1. Sub word-line drivers may be disposed in the sub word-line driver regions SWB. J+1 bit-line sense amplifier regions BLSAB may be disposed, for example, between the sub-array blocks SCB in the second direction D2 and above and below each of the sub-array blocks SCB in the second direction D2. Bit-line sense amplifiers to sense data stored in the memory cells may be disposed in the bit-line sense amplifier regions BLSAB.

A plurality of sub word-line drivers may be provided in each of the sub word-line driver regions SWB. One sub word-line driver region SWB may be associated with two sub-array blocks SCB adjacent to the sub word-line driver region SWB in the first direction D1.

A plurality of conjunction regions CONJ may be disposed adjacent the sub word-line driver regions SWB and the bit-line sense amplifier regions BLSAB. A voltage generator may be disposed in each of the conjunction regions CONJ.

A portion 390 in the first bank array 310a will be described with reference to FIG. 10 below.

FIG. 10 illustrates a portion of the first bank array in FIG. 9 according to some implementations.

Referring to FIGS. 9 and 10, in the portion 390 of the first bank array 310a, sub-array blocks SCBa and SCBb, the bit-line sense amplifier regions BLSAB, four sub word-line driver regions SWBa1, SWBa2, SWBb1 and SWBb2 and two of the conjunction regions CONJ are disposed.

The sub-array block SCBa may include a plurality of word-lines WL0-WL3 extending in the first direction D1 and a plurality of bit-line BTL0-BTL3 extending in the second direction D2. The sub-array block SCBa may include a plurality of memory cells MCs disposed at intersections of the word-lines WL0-WL3 and the bit-line BTL0-BTL3. The sub-array block SCBb may include a plurality of word-lines WL4-WL7 extending in the first direction D1 and the plurality of bit-line BTL0-BTL3 extending in the second direction D2. The sub-array block SCBb may include a plurality of memory cells MCs disposed at intersections of the word-lines WL4-WL7 and the bit-line BTL0-BTL3.

With reference to FIG. 10, the sub word-line driver regions SWBa1 and SWBa2 may include a plurality of sub word-line drivers 631, 632, 633 and 634 that respectively drive the word-lines WL0-WL3. The sub word-line driver regions SWBb1 and SWBb2 may include a plurality of sub word-line drivers 641, 642, 643 and 644 that respectively drive the word-lines WL4-WL7.

The bit-line sense amplifier region BLSAB may include a bit-line sense amplifier BLSA 650 coupled to the bit-line BTL0 in the sub array block SCBb and the bit-line BTL1 in the sub array block SCBa, and a local sense amplifier LSA circuit 680. The bit-line sense amplifier 650 may sense and amplify a voltage difference between the bit-lines BTL0 and BTL1 to provide the amplified voltage difference to a local I/O line pair LIO1 and LIOB1.

The local sense amplifier circuit 680 may control electrical connection between the local I/O line pair LIO1 and LIOB1 and a global I/O line pair GIO1 and GIOB1.

As illustrated in FIG. 10, the conjunction regions CONJ may be disposed adjacent to the bit-line sense amplifier region BLSAB and the sub word-line driver regions SWBa1, SWBb1, SWBa2 and SWBb2. Voltage generators 610 and 620 may be disposed in the conjunction regions CONJ.

FIG. 11 illustrates mapping configuration between data bits input through I/O pads during burst lengths and sub array block in which the data bits are stored.

FIG. 11 illustrates a mapping configuration MAPC between data bits input through I/O pads DQ0-DQ7 during the burst lengths BL0-BL7 and sub array blocks in which the data bits are stored.

Referring to FIG. 11, it is noted that the data bits input through I/O pads DQ0-DQ7 during the burst lengths BL0-BL7 are stored in sub array blocks.

In FIG. 11, reference numeral 511 denotes a defect of a sub word-line driver associated with two sub array blocks.

FIG. 12 illustrates errors that may occur due to the defects in FIG. 11.

Referring to FIG. 12, errors may occur in data bits corresponding to the burst lengths BL0 and BL4 and the I/O pads DQ0, DQ1, DQ2, DQ3, DQ4, DQ5, DQ6 and DQ7 due to the defect 511 of the sub word-line driver.

FIG. 13 illustrates a parity generation matrix, e.g., that may be stored in the memory in the ECC engine of FIG. 3A.

Referring to FIG. 13, the parity generation matrix PGM may include a first parity sub matrix $HS_{11}$ and a second parity sub matrix $HS_{12}$.

The first parity sub matrix $HS_{11}$ includes a plurality of unit sub matrixes ISM corresponding to k (k is a natural number greater than one) symbols in one codeword. Each of the plurality of unit sub matrixes ISM includes p×p elements (p is a natural number greater than one).

The second parity sub matrix $HS_{12}$ includes a plurality of alpha matrixes $\alpha^{i0}$, $\alpha^{i1}$, . . . , $\alpha^{i(k-2)}$, $\alpha^{i(k-1)}$ corresponding to k symbols in one codeword. The alpha matrix $\alpha^{i0}$ may be obtained based on a p-order primitive polynomial. The alpha matrix $\alpha^{i0}$ may be obtained by power of the alpha matrix $\alpha^{i0}$ and elements of the alpha matrixes may be generated based on Reed-Solomon (RS) code.

FIG. 14 illustrates an example of a unit sub matrix in the parity generation matrix in FIG. 13.

Referring to FIG. 14, a unit sub matrix ISM includes p high level elements disposed in a diagonal direction. Each of the other elements except the high level elements has a zero.

FIG. 15 illustrates examples of alpha matrixes in the parity generation matrix in FIG. 13.

Referring to FIG. 15, the alpha matrix $\alpha^{i(k-1)}$ may be obtained by shifting alpha matrix $\alpha^{i(k-2)}$ in a right-hand direction.

In FIGS. 14 and 15, p corresponds to 16 and corresponds to a number of data bits in one symbol including two sub data units.

FIG. 16 illustrates an example of a parity check matrix, e.g., that may be stored in the memory in the ECC engine of FIG. 3A.

Referring to FIG. 16, the parity check matrix PCM may include a first parity sub matrix $HS_{21}$ and a second parity sub matrix $HS_{22}$.

The first parity sub matrix $HS_{21}$ includes a plurality of unit sub matrixes ISM corresponding to k symbols in one codeword, and a unit sub matrix ISM corresponding to the parity data. Each of the plurality of unit sub matrixes ISM includes p×p elements.

The second parity sub matrix $HS_{22}$ includes a plurality of alpha matrixes $\alpha^{i0}$, $\alpha^{i1}$, . . . , $\alpha^{i(k-2)}$ and $\alpha^{i(k-1)}$ corresponding to k symbols in one codeword, and an alpha matrix $\alpha^0$ (=ISM) corresponding to the parity data.

FIG. 17 is a block diagram illustrating an example of an ECC engine, e.g., the ECC engine in FIG. 1, according to some implementations.

Referring to FIG. 17, an ECC engine 120b may include an ECC encoder 125b, an ECC decoder 160b, a memory 170 and a buffer 175.

The memory 170 may be connected to the ECC encoder 125b and the ECC decoder 160b and may store a plurality of ECCs EEC1-ECCq. Here, q is an integer greater than one. The memory 170 may provide the ECC encoder 125b and the ECC decoder 160b with a selected ECC selected from the plurality of ECCs EEC1-ECCq in response to the mapping information MPI.

The buffer 175 may receive the mapping information MPI from the semiconductor memory device 200 in FIG. 1 or the CPU 110 in FIG. 1 during a power-up sequence, may store the mapping information MPI, and may provide the mapping information MPI to the memory 170 in a write operation and a read operation.

The ECC encoder 125*b*, in the write operation, may generate a parity data PRT2 by performing an ECC encoding on a user data DTA including a plurality of sub data units based on the selected ECC, each of which includes a plurality of data bits, and may transmit a codeword CW21 including the parity data PRT2 and a main data MD21 corresponding to the user data DTA to the semiconductor memory device 200.

The ECC decoder 160*b*, in the read operation, may receive a codeword CW22 including a main data MD22 and the parity data PRT2 from the semiconductor memory device 200, may correct at least one error in the main data MD22 on a per-symbol basis by performing an ECC decoding on the main data MD22 using the parity data PRT2 and the selected ECC, and may output a corrected main data C_MD22.

The mapping information MPI may indicate a mapping relationship between the plurality of sub data units and rows (sub word-lines) of the target sub array block storing the plurality of sub data units.

The selected ECC may be configured such that two sub data units to be stored in one row of the target sub array block among the plurality of sub array blocks, among the plurality of sub data units, are included in one symbol.

Because the ECC engine 120*b* performs the ECC encoding and the ECC decoder 160*b* performs the ECC decoding using the selected ECC that is selected based on the mapping information MPI indicating a mapping relationship between the plurality of sub data units and rows of the target sub array block storing the plurality of sub data units, the ECC engine 120*b* may correct errors in one symbol including two sub data units on a per-symbol basis, from among the plurality of sub data units.

FIG. 18 is a block diagram illustrating a memory system according to some implementations.

Referring to FIG. 18, a memory system 20*a* may include a memory controller 100*a* (e.g., an external memory controller) and a semiconductor memory device 200*a*.

The memory controller 100*a* may control the overall operation of the memory system 20*a*. The memory controller 100*a* may control the overall data exchange between an external host and the semiconductor memory device 200*a*. For example, the memory controller 100*a* may write data in the semiconductor memory device 200*a* or read data from the semiconductor memory device 200*a* in response to request from the host.

In addition, the memory controller 100*a* may issue operation commands to the semiconductor memory device 200*a* for controlling the semiconductor memory device 200*a*.

In some implementations, the semiconductor memory device 200*a* is a memory device including a plurality of dynamic (volatile) memory cells such as a DRAM, DDR5 SDRAM, DDR6 SDRAM, or a stacked memory device such as a HBM.

The memory controller 100*a* may transmit a clock signal CLK, a command CMD, and an address (signal) ADDR to the semiconductor memory device 200*a* and exchanges main data MD3 with the semiconductor memory device 200*a*.

The memory controller 100*a* may include a CPU 110 that controls an overall operation of the memory controller 100*a*.

The semiconductor memory device 200*a* may include a memory cell array 310 that stores the main data MD, an on-die ECC engine 400, and a control logic circuit 210*a*. The memory cell array 310 may be divided into a plurality of sub array blocks arranged in a first direction and a second direction crossing the first direction.

The on-die ECC engine 400 may generate a parity data using an ECC which is represented by a generation matrix by performing an ECC encoding on the main data MD including a plurality of sub data units, each of which includes a plurality of data bits, and may generate the parity data by performing a first interleaved matrix-multiplication (i.e., by performing index interleaving) on the plurality of sub data units and sub code groups of a plurality of code groups based on mapping information, such that two sub data units to be stored in one row of a target sub array block among the plurality of sub array blocks, among the plurality of sub data units, are included in one symbol. The mapping information may indicate a mapping relationship between the plurality of sub data units and rows of the target sub array block storing the plurality of sub data units.

FIG. 19 is a block diagram illustrating the semiconductor memory device in FIG. 18 according to some implementations.

Referring to FIG. 19, the semiconductor memory device 200*a* may include the control logic circuit 210*a*, an address register 220, a bank control logic 230, a row address multiplexer 240, a column address latch 250, a row decoder 260, a column decoder 270, the memory cell array 310, a sense amplifier unit 285, an I/O gating circuit 290*a*, a data I/O buffer 295*a*, the on-die ECC engine 400, and a refresh counter 245.

The memory cell array 310 may include first through sixteenth bank arrays 310*a*-310*p*. The row decoder 260 may include first through sixteenth row decoders 260*a*-260*p* respectively coupled to the first through sixteenth bank arrays 310*a*-310*p*. The column decoder 270 may include first through sixteenth column decoders 270*a*-270*p* respectively coupled to the first through sixteenth bank arrays 310*a*-310*p*. The sense amplifier unit 285 may include first through sixteenth sense amplifiers 285*a*-285*p* respectively coupled to the first through sixteenth bank arrays 310*a*-310*p*. The first through sixteenth bank arrays 310*a*-310*p*, the first through sixteenth row decoders 260*a*-260*p*, the first through sixteenth column decoders 270*a*-270*p*, and first through sixteenth sense amplifiers 285*a*-285*p* may form first through sixteenth banks. In addition, each of the first through sixteenth bank arrays 310*a*-310*p* may be divided into a plurality of sub array blocks arranged in a first direction and a second direction.

Each of the first through sixteenth bank arrays 310*a*-310*p* may include a plurality of memory cells MC coupled to word-lines WL and bit-lines BTL. Each of the plurality of memory cells MC may have a DRAM cell configuration.

The address register 220 may receive an address ADDR including a bank address BANK_ADDR, a row address ROW_ADDR and a column address COL_ADDR, and a command CMD from the memory controller 100*a*.

The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through sixteenth row decoders 260*a*-260*p* corresponding to the bank address BANK_ADDR may be activated in response to the bank control signals, and one of the first through sixteenth column decoders 270*a*-270*p* corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output one of the row address ROW_ADDR or the refresh row address REF_ADDR as a row address RA. The row address RA that is output from the row address multiplexer 240 may be applied to the first through sixteenth row decoders 260a-260p.

The activated one of the first through sixteenth row decoders 260a-260p may decode the row address RA that is output from the row address multiplexer 240, and may activate a word-line corresponding to the row address RA. For example, the activated bank row decoder may apply a word-line driving voltage to the word-line corresponding to the row address RA.

The column address latch 250 may receive the column address COL_ADDR from the address register 220, and may temporarily store the received column address COL_ADDR. In some implementations, in a burst mode, the column address latch 250 may generate column addresses COL_ADDR' that increment from the received column address COL_ADDR. The column address latch 250 may apply the temporarily stored or generated column address COL_ADDR' to the first through sixteenth column decoders 270a-270p.

The activated one of the first through sixteenth column decoders 270a-270p may decode the column address COL_ADDR' that is output from the column address latch 250, and may control the I/O gating circuit 290 to output data corresponding to the column address COL_ADDR.

The I/O gating circuit 290a may include circuitry for gating input/output data. The I/O gating circuit 290a may further include read data latches for storing data that is output from the first through sixteenth bank arrays 310a-310p, and write drivers for writing data to the first through sixteenth bank arrays 310a-310p.

Codeword CW3 to be read from one bank array of the first through sixteenth bank arrays 310a-310p may be sensed by a sense amplifier coupled to the one bank array from which the codeword is to be read, and may be stored in the read data latches. The codeword CW3 stored in the read data latches is ECC-decoded by the on-die ECC engine 400 and may be provided to the memory controller 100a via the data I/O buffer 295a.

The main data MD3 to be written in one bank array of the first through sixteenth bank arrays 310a-310p may be provided to the data I/O buffer 295a from the memory controller 100a. The main data MD3 is provided to the on-die ECC engine 400.

The on-die ECC engine 400 may perform ECC encoding on the main data MD3 to generate a parity data, and provides the I/O gating circuit 290a with the codeword CW3 including the main data MD3 and the parity data. The I/O gating circuit 290a may store the main data MD3 and the parity data the target sub array blocks of the memory cell array 310 based on a control signal CTL21 from the control logic circuit 210a.

The on-die ECC engine 400 may perform ECC decoding on the main data MD3 using the parity date read from the memory cell array 310.

The on-die ECC engine 400 may perform the ECC encoding and the ECC decoding by performing index interleaving on the plurality of sub data units and sub code groups of a plurality of code groups in the ECC based on the mapping information MPI, such that two sub data units to be stored in one row of a target sub array block among the plurality of sub array blocks, among the plurality of sub data units, are included in one symbol.

The control logic circuit 210a may control operations of the semiconductor memory device 200a. For example, the control logic circuit 210 may generate control signals for the semiconductor memory device 200a to perform a write operation or a read operation. The control logic circuit 210a may include a command decoder 211 that decodes the command CMD received from the memory controller 100a, and a mode register 212 that sets an operation mode of the semiconductor memory device 200a.

For example, the command decoder 211 may generate the control signals corresponding to the command CMD by decoding a write enable signal, a row address strobe signal, a column address strobe signal, a chip select signal, etc. The control logic circuit 210 may generate a first control signal CTL21 for controlling the I/O gating circuit 290a and a second control signal CTL22 for controlling the on-die ECC engine 400.

The mapping information MPI may be set in the mode register 212 by the memory controller 100a and the control logic circuit 210a may provide the mapping information MPI to the on-die ECC engine 400 during a power-up sequence of the semiconductor memory device 200a.

FIG. 20 is a block diagram illustrating an example of an on-die ECC engine, e.g., the on-die ECC engine in the semiconductor memory device of FIG. 19, according to some implementations.

Referring to FIG. 20, the on-die ECC engine 400 may include an ECC memory 410, an ECC encoder 430, and an ECC decoder 450.

The ECC memory 410 stores an ECC 415. The ECC 415 may be represented by a generation matrix (e.g., a data format/structure of the ECC 415 may be a generation matrix), and may include a plurality of column vectors corresponding to data bits in the main data (e.g., MD3) and the parity data.

The ECC encoder 430 may be connected to the memory 410, and may perform ECC encoding on the main data MD3 using the ECC 415 stored in the memory 410 to generate the parity data PRT3 in a write operation of the semiconductor memory device 200a. The ECC encoder 430 may provide the I/O gating circuit 290a with the codeword CW3 including the main data MD3 and the parity data PRT3.

The ECC decoder 450 may be connected to the memory 410, may receive the codeword CW3 including the main data MD3 and the parity data PRT3, may perform ECC decoding on the main data MD3 based on the parity data PRT3 using the ECC 415 to correct and/or detect an error bit in the main data MD3, and may output corrected main data C_MD3. The ECC 415 may be a Reed-Solomon (RS) code that corrects error bits in one symbol of the main data MD3.

When the ECC encoder 430 and the ECC decoder 450 performs the ECC encoding and the ECC decoding, respectively, the ECC encoder 430 and the ECC decoder 450 may perform an interleaved matrix-multiplication on the plurality of sub data units and sub code groups of the plurality of code groups in the ECC 415 based on the mapping information MPI. The ECC encoder 430 may generate the parity data PRT3 by performing a first interleaved matrix-multiplication on the plurality of sub data units and sub code groups based on the mapping information MPI. The ECC decoder 450 may generate check bits by performing a second interleaved matrix-multiplication on the plurality of sub data units and sub code groups based on the mapping information MPI.

Although it is described with reference to FIG. 20 that the memory 410 is coupled to the ECC encoder 430 and the ECC decoder 450, in some implementations, the memory 410 may be implemented with exclusive OR gates within the ECC encoder 430 and the ECC decoder 450.

FIG. 21 is a block diagram illustrating an ECC decoder, e.g., the ECC decoder in the on-die ECC engine of FIG. 20, according to some implementations.

Referring to FIG. 21, the ECC decoder 450 may include a check bit generator 451, a syndrome generator 453, and a data corrector 455.

The check bit generator 451 may generate check bits CHB3 based on the data bits in the main data MD3 using the ECC 415 and the mapping information MPI. The syndrome generator 453 may generate syndrome data SDR3 indicating whether an error bit occurs and a position of the error bit based on a comparison of the check bits CHB3 and parity bits of the parity data PRT3.

The data corrector 455 may receive the main data MD3 and the syndrome data SDR3, may correct the error bit in the main data MD3, and may output the corrected main data C_MD3.

FIG. 22 illustrates relationships of the ECC and the parity bits used in the on-die ECC engine of FIG. 20 according to some implementations.

In FIG. 22, it is assumed that the main data MD3 includes a plurality of sub data units SDU0-SDU2$x$-1, and the parity data PRT3 includes 8-bit parity bits PB1-PB8. In FIG. 22, it is assumed that x is a natural number equal to or greater than eight, but the scope of this disclosure is not limited thereto.

Referring to FIG. 22, the ECC 415 may be divided into a plurality of code groups CG1-CGx and PCG corresponding to the plurality of sub data units SDU0-SDU2$x$-1 and the parity data PRT. The code group PCG may include a plurality of column vectors PV1-PV8 corresponding to parity bits PB1-PB8 of the parity data PRT. Each of the plurality of code groups CG1-CGx may correspond to respective two sub data units among the plurality of sub data units SDU0-SDU2$x$-1. For example, the code group CG1 may correspond to two sub data units SDU0 and SDU1, the code group CG2 may correspond to two sub data units SDU2 and SDU3, and the code group CGx may correspond to two sub data units SDU2$x$-2 and SDU2$x$-1.

FIG. 23 illustrates an example of the ECC of FIG. 22 according to some implementations.

In FIG. 23, it is assumed that the main data MD3 includes 64-bit data bits d0-d63. That is, it is assumed that x is four in FIG. 22.

Referring to FIG. 23, the data bits d0-d63 of the main data MD3 may correspond to code groups CG11, CG12, CG13 and CG14 of an ECC ECCa in units of 16-bits.

The code group CG11 may be divided into two sub code groups SCG11 and SCG12, the code group CG12 may be divided into two sub code groups SCG21 and SCG22, the code group CG13 may be divided into two sub code groups SCG31 and SCG32, and the code group CG14 may be divided into two sub code groups SCG41 and SCG42.

The code groups CG11, CG12, CG13 and CG14 may correspond to the parity generation matrix PGM in FIG. 13. Each of the code groups CG11, CG12, CG13 and CG14 may include a unit sub matrix ISM and an alpha matrix. Accordingly, each of the sub code groups SCG11 and SCG12 may include a half of the unit sub matrix ISM and a half of a corresponding alpha matrix, each of the sub code groups SCG21 and SCG22 may include a half of the unit sub matrix ISM and a half of a corresponding alpha matrix, each of the sub code groups SCG31 and SCG32 may include a half of the unit sub matrix ISM and a half of a corresponding alpha matrix, and each of the sub code groups SCG41 and SCG42 may include a half of the unit sub matrix ISM and a half of a corresponding alpha matrix.

FIG. 24 illustrates an example of mapping information according to some implementations.

Referring to FIG. 24, the on-die ECC engine 400 may generate the parity data PRT3 and the check bits CHB3, respectively, by performing an index interleaving on the plurality of sub data units SDU0, SDU1, SDU2, SDU3, SDU4, SDU5, SDU6 and SDU7 and the sub code groups SCG11, SCG12, SCD21, SCG22, SCG31, SCG32, SCG41 and SCG42 based on mapping information MPIb, such that respective two sub data units SDU0 and SDU4, SDU1 and SDU5, SDU2 and SDU6, and SDU3 and SDU7 to be stored in one row of the target sub array block correspond to sub code groups SCG11 and SCG12, SCD21 and SCG22 and SCG31, SCG32 and, SCG41 and SCG42 in each of code groups, respectively. Therefore, when errors occur in memory cells in one memory cell row, the ECC decoder 450 may correct error bits in one symbol.

For example, the ECC encoder 430 in FIG. 20 may generate a corresponding parity bit of the parity data PRT3 by performing a matrix-multiplication on the sub code group SGC11 and the sub data unit SDU0, may generate a corresponding parity bit of the parity data PRT3 by performing a matrix-multiplication on the sub code group SGC12 and the sub data unit SDU4, may generate a corresponding parity bit of the parity data PRT3 by performing a matrix-multiplication on the sub code group SGC21 and the sub data unit SDU1, and may generate a corresponding parity bit of the parity data PRT3 by performing a matrix-multiplication on the sub code group SGC22 and the sub data unit SDU5.

The ECC encoder 430 may generate a corresponding parity bit of the parity data PRT3 by performing a matrix-multiplication on the sub code group SGC31 and the sub data unit SDU3, may generate a corresponding parity bit of the parity data PRT3 by performing a matrix-multiplication on the sub code group SGC32 and the sub data unit SDU6, may generate a corresponding parity bit of the parity data PRT3 by performing a matrix-multiplication on the sub code group SGC41 and the sub data unit SDU3, and may generate a corresponding parity bit of the parity data PRT3 by performing a matrix-multiplication on the sub code group SGC42 and the sub data unit SDU7.

In addition, the ECC decoder 450 in FIG. 20 may generate a corresponding bit of the check bits CHB3 by performing a matrix-multiplication on the sub code group SGC11 and the sub data unit SDU0, may generate a corresponding bit of the check bits CHB3 by performing a matrix-multiplication on the sub code group SGC12 and the sub data unit SDU4, may generate a corresponding bit of the check bits CHB3 by performing a matrix-multiplication on the sub code group SGC21 and the sub data unit SDU1, and may generate a corresponding bit of the check bits CHB3 by performing a matrix-multiplication on the sub code group SGC22 and the sub data unit SDU5.

The ECC decoder 450 may generate a corresponding bit of the check bits CHB3 by performing a matrix-multiplication on the sub code group SGC31 and the sub data unit SDU3, may generate a corresponding bit of the check bits CHB3 by performing a matrix-multiplication on the sub code group SGC32 and the sub data unit SDU6, may generate a corresponding bit of the check bits CHB3 by performing a matrix-multiplication on the sub code group SGC41 and the sub data unit SDU3, and may generate a corresponding bit of the check bits CHB3 by performing a matrix-multiplication on the sub code group SGC42 and the sub data unit SDU7.

When the ECC encoder 430 and the ECC decoder 450 generate the parity data PRT3 and the check bits CHB3, respectively, by performing matrix-multiplication on respective two sub data units SDU0 and SDU4, SDU1 and SDU5, SDU2 and SDU6, and SDU3 and SDU7 to be stored in one row of the target sub array block and the sub code groups SCG11 and SCG12, SCD21 and SCG22 and SCG31, SCG32 and, SCG41 and SCG42 in each of code groups, the ECC decoder 450 may correct error bits on a per-symbol basis because the parity bits and the check bits associated with one symbol are associated with one code group.

FIG. 25 is a block diagram illustrating a semiconductor memory device according to some implementations.

Referring to FIG. 25, a semiconductor memory device 800 may include at least one buffer die 810 and a plurality of memory dies 820-1 to 820-*s* (*s* is a natural number equal to or greater than three) providing a soft error analyzing and correcting function in a stacked chip structure.

The plurality of memory dies 820-1 to 820-*s* are stacked on the buffer die 810 and conveys data through a plurality of through silicon via (TSV) lines.

Each of the plurality of memory dies 820-1 to 820-*s* may include a cell core 821 to store data and a cell core ECC engine 823 which generates transmission parity bits (e.g., transmission parity data) based on transmission data to be sent to the at least one buffer die 810. The cell core 821 may include a plurality of memory cells having DRAM cell structure.

The cell core ECC engine 823 may employ the ECC engine 400 of FIG. 20. Accordingly, the cell core ECC engine 823 may perform an ECC encoding on data to be stored in the cell core 821 and an ECC decoding on data read from the cell core 821 by performing an interleaved matrix-multiplication on a plurality of sub data units and a sub code groups of a plurality of code groups included in an ECC. Therefore, the cell core ECC engine 823 may correct error bits in the data on a per-symbol basis without increasing complexity The buffer die 810 may include a via ECC engine 812 which corrects a transmission error using the transmission parity bits when a transmission error is detected from the transmission data received through the TSV liens and generates error-corrected data.

The buffer die 810 may further include a data I/O buffer 816. The data I/O buffer 816 may temporarily store a MD from the via ECC engine 812 and may output the data MD to an outside.

The semiconductor memory device 800 may be a stack chip type memory device or a stacked memory device which conveys data and control signals through the TSV lines. The TSV lines may be also called 'through electrodes'.

The cell core ECC engine 823 may perform error correction on data which is outputted from the memory die 820-*p* before the transmission data is sent.

A data TSV line group 832 which is formed at one memory die 820-*p* may include TSV lines L1, L2, . . . , Ls, and a parity TSV line group 834 may include TSV lines L10 to Lt. The TSV lines L1, L2, . . . , Ls of the data TSV line group 832 and the parity TSV lines L10 to Lt of the parity TSV line group 834 may be connected to micro bumps MCB which are correspondingly formed among the memory dies 820-1 to 820-*s*.

The semiconductor memory device 800 may have a three-dimensional (3D) chip structure or a 2.5D chip structure to communicate with the host through a data bus B10. The buffer die 810 may be connected with the memory controller through the data bus B10.

According to some implementations, as illustrated in FIG. 25, the cell core ECC engine 823 may be included in the memory die, the via ECC engine 812 may be included in the buffer die. Accordingly, it may be possible to detect and correct soft data fail. The soft data fail may include a transmission error which is generated due to noise when data is transmitted through TSV lines.

FIG. 26 is a configuration diagram illustrating a semiconductor package including a stacked memory device (e.g., the stacked memory device of FIG. 25) according to some implementations.

Referring to FIG. 26, a semiconductor package 900 may include one or more stacked memory devices 910 and a graphic processing unit (GPU) 920.

The stacked memory devices 910 and the GPU 920 may be mounted on an interposer 930, and the interposer on which the stacked memory device 910 and the GPU 920 are mounted may be mounted on a package substrate 940 mounted on solder balls 950. The GPU 920 may correspond to a semiconductor device which may perform a memory control function, and for example, the GPU 920 may be implemented as an application processor (AP). The GPU 920 may include a memory controller (CTRL) 921 having a scheduler.

The stacked memory device 910 may be implemented in various forms, and the stacked memory device 910 may be a memory device in a high bandwidth memory (HBM) form in which a plurality of layers are stacked. Accordingly, the stacked memory device 910 may include a buffer die and a plurality of memory dies and each of the plurality of memory dies include a cell core and a cell core ECC engine.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions. When the stacked memory device 910 includes a direct access region, a test signal may be provided into the stacked memory device 910 through conductive means (e.g., solder balls 950) mounted under package substrate 940 and the direct access region.

FIG. 27 is an example of a computing system in which a memory system according to some implementations corresponds to a Type 3 memory system defined by a compute express link (CXL) protocol.

Referring to FIG. 27, a computing system 1300 may include a root complex 1310, a CXL memory expander 1320 connected to the root complex 1310 and a memory resource 1330. The memory resource 1330 may correspond to the semiconductor memory device 200 in FIG. 1.

The root complex 1310 may include a home agent 1311 and an I/O bridge 1313, and the home agent 1311 may communicate with the CXL memory expander 1320 based on a coherent protocol CXL.mem the I/O bridge 1313 may communicate with the CXL memory expander 1320 based on a non-coherent protocol, i.e., an I/O protocol CXL.io. In a CXL protocol base, the home agent 1311 may correspond to an agent on a host side that is arranged to solve the entire consistency of the computing system 1300 for a given address.

The CXL memory expander 1320 may include a memory controller 1321 and the memory controller 1321 may employ the memory controller 100 in FIG. 1. Accordingly, the memory controller 1321 may include an ECC engine 1325, and the ECC engine 1325 may interleave or de-interleave data based on mapping information indicating a mapping relation between a plurality of sub data units in a user data and memory cell rows of memory regions MR1, MR2, . . . , MRf. Here, f is an integer greater than two.

In addition, the CXL memory expander 1320 may output data to the root complex 1310 via the I/O bridge 1313 based on the I/O protocol CXL.io or the PCIe.

The memory resource 1330 may include a plurality of memory regions MR1, MR2, . . . , MRf and each of the plurality of memory regions MR1, MR2, . . . , MRf may be implemented as a memory of a various units.

FIG. 28 is a block diagram illustrating a data center including a computing system according to some implementations.

Referring to FIG. 28, a data center 2000 may be a facility that collects various types of data and provides various services, and may be referred to as a data storage center. The data center 2000 may be a system for operating search engines and databases, and may be a computing system used by companies such as banks or government agencies. The data center 2000 may include application servers 2100_1 to 2100_U and storage servers 2200_1 to 2200_V. The number of the application servers 2100_1 to 2100_U and the number of the storage servers 2200_1 to 2200_V may be variously selected according to some implementations, and the number of the application servers 2100_1 to 2100_U and the number of the storage servers 2200_1 to 2200_V m may be different from each other.

Below, for convenience of description, an example of the storage server 2200_1 will be described.

The storage server 2200_1 may include a processor 2210_1, a memory 2220_1, a switch 2230_1, a network interface controller (NIC) 2240_1, a storage device 2250_1 and CXL interface 2260_1. The storage server 2200_V may include a processor 2210_v, a memory 2220_v, a switch 2230_v, a NIC 2240_v, a storage device 2250_v and CXL interface 2260_v.

The processor 2210_1 may control overall operation of the storage server 2200_1. The memory 2220_1 may store various instructions or data under control of the processor 2210_1. The processor 2210_1 may be configured to access the memory 2220_1 to execute various instructions or to process data. In some implementations, the memory 2220_1 may include at least one of various kind of memory devices such as double data rate synchronous DRAM (DDR SDRAM), high bandwidth memory (HBM), hybrid memory cube (HMC), dual in-line memory module (DIMM), Optane DIMM or non-volatile DIMM.

In some implementations, the number of the processors 2210_1 included in the storage server 2200_1 and the number of the memories 2220_1 included in the storage server 2200_1 may be variously changed or modified. In some implementations, the processor 2210_1 and the memory 2220_1 included in the storage server 2200_1 may constitute a processor-memory pair and the number of processor-memory pairs included in the storage server 2200_1 maybe variously changed or modified. In some implementations, the number of the processors 2210_1 included in the storage server 2200_1 and the number of the memories 2220_1 included in the storage server 2200_1 may be different. The processor 2210_1 may include a single core processor and a multi-core processor.

Under control of the processor 2210_1, the switch 2230_1 may selectively connect the processor 2210_1 and the storage device 2250_1 or may selectively connect the NIC 2240-1, the storage device 2250_1 and the CXL interface 2260_1.

The NIC 2240_1 may connect the storage server 2220_1 with a network NT. The NIC 22401 may include a network interface card, a network adapter, and the like. The NIC 2240_1 may be connected to the network NT through a wired interface, a wireless interface, a Bluetooth interface, or an optical interface. The NIC 22401 may include an internal memory, a digital signal processor (DSP), a host bus interface, and the like and may be connected with the processor 2210_1 or the switch 2230_1 through the host bus interface. The host bus interface may include at least one of various interface schemes such as an advanced technology attachment (ATA), a serial ATA (SATA) an external SATA (e-SATA), a small computer system interface (SCSI), a serial attached SCSI (SAS), a peripheral component inter-connection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc. In some implementations, the NIC 2240_1 may be integrated with at least one of the processor 2210_1, the switch 2230_1 and the storage device 2250_1.

Under control of the processor 2210_1, the storage device 2250_1 may store data or may output the stored data. The storage device 2250_1 may include a controller CTRL 2251_1, a nonvolatile memory NAND 2252_1, a DRAM 2253_1 and an interface I/F 2254_1. In some implementations, the storage device 2250_1 may further include a secure element SE for security or privacy. The storage device 2250_v may include a controller CTRL 2251_v, a nonvolatile memory NAND 2252_v, a DRAM 2253_v and an interface I/F 2254_v. In some implementations, the storage device 2250_v may further include a secure element SE for security or privacy.

The controller 2251_1 may control overall operation of the storage device 2250_1. The controller 2251_1 may include an SRAM. In response to signals received through the interface 22541, the controller 2251_1 may store data in the nonvolatile memory 2252_1 or may output data stored in the nonvolatile memory 2252_1. The controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) necessary of the controller 2251_1 to operate. The interface 2254_1 may provide a physical connection between the controller 2251_1 and the processor 2210_1, the switch 2230_1 or the NIC 2240_1. The interface 2254_1 may be implemented to support direct-attached storage (DAS) manner that allows the direct connection of the storage device 2250_1 through a dedicated cable. The interface 22541 may be implemented based on at least one of various above-described interfaces through a host interface bus.

The above components of the storage server 2200_1 are provided as an example, and the present disclosure is not limited thereto. The above components of the storage server 2200_1 may be applied to each of the other storage servers or each of the application servers 2100_1 to 2100_U. In each of the application servers 2100_1 to 2100_U, a storage device 2150_1 may be selectively omitted.

The application server 2100_1 may include a processor 2110_1, a memory 2120_1, a switch 2130_1, a NIC 2140_1, and CXL interface 2160_1. The application server 2100_U may include a processor 2110_u, a memory 2120_u, a switch 2130_u, a NIC 2140_1, and CXL interface 2160_u.

The application servers 2100_1 to 2100_U and the storage servers 2200_1 to 2200_V may communicate with each other through the network NT. The network NT may be implemented using a fiber channel (FC) or an Ethernet. The FC may be a medium used for a relatively high speed data transmission, and an optical switch that provides high performance and/or high availability may be used. The storage servers 2200_1 to 2200_V may be provided as file storages, block storages or object storages according to an access scheme of the network 3300.

In some implementations, the network NT may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In some implementations, the network NT may be a general network such as the TCP/IP network. For example, the network NT may be implemented according to at least one of protocols such as an FC over Ethernet (FCoE), a network attached storage (NAS), a nonvolatile memory express (NVMe) over Fabrics (NVMe-oF), etc.

In some implementations, at least one of the plurality of application servers 2100_1 to 2100_U may be configured to access at least one of the remaining application servers or at least one of the storage servers 2200_1 to 2200_V over the network NT.

For example, the application server 2100_1 may store data requested by s user or a client in at least one of the storage servers 2200_1 to 2200_V over the network NT. Alternatively, the application server 2100_1 may obtain data requested by s user or a client in at least one of the storage servers 2200_1 to 2200_V over the network NT. In this case, the application server 2100_1 may be implemented with a web server, a database management system (DBMS), or the like.

The application server 2100_1 may access a memory 2120_1 or a storage device 2105_1 of the application server 2100_1 or the storage device 2250_1 of the storage server 2000_1 over the network NT. As such, the application server 2100_1 may perform various operations on data stored in the application servers 2100_1 to 2100_U and/or the storage servers 2200_1 to 2200_V. For example, the application server 2100_1 may execute a command for moving or copying data between the application servers 2100_1 to 2100_U and/or the storage servers 2200_1 to 2200_V. The data may be transferred from the storage devices 2250_1 to 2250_v of the storage servers 2200_1 to 2200_V to the memories 2120_1 to 2120_u of the application servers 2100_1 to 2100_U directly or through the memories 2220_1 to 2220_v of the storage servers 2200_1 to 2200_V. For example, the data transferred through the network NT may be encrypted data for security or privacy.

The storage servers 2200_1 to 2200_V and the application servers 2100_1 to 2100_U may be connected with a memory expander 2300 through the CXL interfaces 2260_1 to 2260_v and 2160_1 to 2160_u. The memory expander 2300 may be used as expanded memory of each of the storage servers 2200_1 to 2200_V and the application servers 2100_1 to 2100_U or virtualized component included therein may communicate with each other through the CXL interfaces 2260_1 to 2260_v and 2160_1 to 2160_u and the memory expander 2300.

The present disclosure may be applied to various semiconductor memory devices and systems that employ an ECC. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been particularly shown and described with reference to examples thereof, it will be understood by those of ordinary skill in the art that various changes in form and detail may be made therein without departing from the spirit and scope of the present disclosure as defined by the following claims.

What is claimed is:

1. A memory system comprising:
a semiconductor memory device comprising a memory cell array, wherein the memory cell array includes a plurality of memory cells connected to word-lines and bit-lines, and wherein the memory cell array is divided into a plurality of sub array blocks arranged in a first direction and a second direction crossing the first direction; and
a memory controller configured to control the semiconductor memory device,
wherein the memory controller includes an error correction code (ECC) engine configured to, in a write operation:
generate parity data by performing ECC encoding on user data including a plurality of sub data units, each of the plurality of sub data units including a plurality of data bits;
generate main data by interleaving the plurality of sub data units based on mapping information, such that two sub data units of the plurality of sub data units are included in one symbol, wherein the two sub data units are stored in one row of a target sub array block of the plurality of sub array blocks; and
transmit the main data and the parity data to the semiconductor memory device, and
wherein the mapping information indicates a mapping relationship between the plurality of sub data units and corresponding rows of the target sub array block storing the plurality of sub data units.

2. The memory system of claim 1, wherein the ECC engine is configured to, in a read operation:

receive the main data and the parity data from the semiconductor memory device;

generate intermediate main data by de-interleaving the main data based on the mapping information; and correct at least one error in the intermediate main data on a per-symbol basis by performing ECC decoding on the intermediate main data using the parity data.

3. The memory system of claim 1, wherein at least one of the semiconductor memory device or a central processing unit is configured to control the ECC engine and provide the mapping information to the ECC engine, and wherein the ECC engine is configured to store the mapping information in a buffer included in the ECC engine.

4. The memory system of claim 1, wherein the two sub data units included in the one symbol are stored in memory cells coupled to a first word-line in the target sub array block, and wherein one sub word-line driver is configured to drive the first word-line.

5. The memory system of claim 1, wherein each of the plurality of the sub data units corresponds to a burst length indicating an amount of data that is input or output at one time between the memory controller and the semiconductor memory device.

6. The memory system of claim 1, wherein the semiconductor memory device further includes a control logic circuit configured to control access to the memory cell array based on a command received from the memory controller and an address received from the memory controller.

7. The memory system of claim 1, wherein the ECC engine includes:

an ECC encoder configured to generate the parity data by performing the ECC encoding on the user data using a parity generation matrix;

a data interleaver configured to generate the main data by interleaving the plurality of sub data units based on the mapping information; and a buffer configured to store the main data and the parity data therein, transmit a codeword including the main data and the parity data to the semiconductor memory device, and store the mapping information.

8. The memory system of claim 7, wherein the ECC engine further includes:

a data de-interleaver configured to receive the main data and the parity data from the semiconductor memory device and generate an intermediate main data by de-interleaving the main data based on the mapping information;

an ECC decoder configured to correct at least one error in the intermediate main data on a per-symbol basis by performing ECC decoding on the intermediate main data using the parity data and a parity check matrix; and a memory configured to store the parity generation matrix and the parity check matrix, wherein the ECC decoder is configured to correct errors in the two sub data units included in the one symbol by performing the ECC decoding.

9. The memory system of claim 7, wherein the data interleaver is configured to interleave the plurality of sub data units based on the mapping information such that the two sub data units included in the one symbol are stored in memory cells coupled to a first word-line in the target sub array block, and wherein one sub word-line driver is configured to drive the first word-line.

10. The memory system of claim 1, wherein the ECC engine includes:

a buffer configured to store the mapping information;

an ECC encoder configured to, in the write operation:

generate the parity data by performing the ECC encoding on the user data using a parity generation matrix;

generate the main data by interleaving the plurality of sub data units based on the mapping information;

generate interleaved parity data by interleaving the parity data based on the mapping information; and transmit an interleaved codeword including the main data and the interleaved parity data to the semiconductor memory device; and an ECC decoder configured to, in a read operation:

receive the main data and the interleaved parity data from the semiconductor memory device;

generate an intermediate main data and the parity data by de-interleaving the main data and the interleaved parity data based on the mapping information; and correct at least one error in the intermediate main data on a per-symbol basis by performing ECC decoding on the intermediate main data using the parity data.

11. A memory system, comprising:

a semiconductor memory device comprising a memory cell array, wherein the memory cell array includes a plurality of memory cells connected to word-lines and bit-lines, and wherein the memory cell array is divided into a plurality of sub array blocks arranged in a first direction and a second direction crossing the first direction; and a memory controller configured to control the semiconductor memory device, wherein the memory controller includes an error correction code (ECC) engine configured to, in a write operation:

generate, based on a selected ECC, parity data by performing ECC encoding on user data including a plurality of sub data units, each of the plurality of sub data units including a plurality of data bits, the selected ECC being selected from a plurality of ECCs based on mapping information, and transmit the parity data and main data corresponding to the user data to the semiconductor memory device, wherein the mapping information indicates a mapping relationship between the plurality of sub data units and corresponding rows of a target sub array block, of the plurality of sub array blocks, storing the plurality of sub data units, and wherein the plurality of sub data units are interleaved in the main data, such that two sub data units of the plurality of sub data units are included in one symbol, and wherein the two sub data units are stored in one row of the target sub array block.

12. The memory system of claim 11, wherein the ECC engine is configured to, in a read operation:

receive the main data and the parity data from the semiconductor memory device; and correct at least one error in the main data on a per-symbol basis by performing ECC decoding on the main data using the parity data and the selected ECC.

13. The memory system of claim 11, wherein at least one of the semiconductor memory device or a central processing unit is configured to control the ECC engine and provide the mapping information to the ECC engine, and wherein the ECC engine is configured to store the mapping information in a buffer included in the ECC engine.

14. The memory system of claim 11, wherein the semiconductor memory device further includes a control logic circuit configured to control access to the memory cell array based on a command and an address received from the memory controller.

15. The memory system of claim 11, wherein the ECC engine includes:

an ECC encoder configured to generate the parity data by performing the ECC encoding on the user data using the selected ECC in the write operation;

an ECC decoder configured to, in a read operation, correct at least one error in the main data on a per-symbol basis by performing ECC decoding on the main data using the parity data received from the memory controller and using the selected ECC;

a memory configured to store the plurality of ECCs; and a buffer configured to store the mapping information.

16. A semiconductor memory device comprising:

a memory cell array including a plurality of memory cells connected to word-lines and bit-lines, the memory cell array divided into a plurality of sub array blocks arranged in a first direction and a second direction crossing the first direction;

an on-die error correction code (ECC) engine configured to, in a write operation, generate parity data based on main data including a plurality of sub data units by using an ECC represented by a generation matrix, each of the plurality of sub data units including a plurality of data bits;

an input/output (I/O) gating circuit coupled between the memory cell array and the on-die ECC engine, the I/O gating circuit configured to store the main data and the parity data in the memory cell array; and a control logic circuit configured to control the on-die ECC engine and the I/O gating circuit, wherein the on-die ECC engine is configured to generate the parity data by performing a first interleaved matrix-multiplication on the plurality of sub data units and sub code groups of a plurality of code groups based on mapping information, such that two sub data units of the plurality of sub data units are included in one symbol, wherein the two sub data units are stored in one row of a target sub array block of the plurality of sub array blocks, and wherein the mapping information indicates a mapping relationship between the plurality of sub data units and the sub code groups.

17. The semiconductor memory device of claim 16, wherein the on-die ECC engine is configured to, in a read operation:

receive the main data and the parity data from the memory cell array;

generate check bits by performing a second interleaved matrix-multiplication on the plurality of sub data units and the sub code groups based on the mapping information; and correct at least one error in the main data on a per-symbol basis based on comparing the parity data with the check bits.

18. The semiconductor memory device of claim 16, wherein the on-die ECC engine includes:

an ECC encoder configured to, in the write operation, generate the parity data by performing the first interleaved matrix-multiplication on the plurality of sub data units and the sub code groups based on the mapping information, wherein the ECC encoder is configured to, in a read operation, read the main data and the parity data from the memory cell array, generate check bits by performing a second interleaved matrix-multiplication on the plurality of sub data units and the sub code groups based on the mapping information, and correct at least one error in the main data on a per-symbol basis based on comparing the parity data with the check bits; and a memory configured to store the ECC.

19. The semiconductor memory device of claim 18, wherein each of the plurality of code groups corresponds to respective two sub data units of the plurality of sub data units; and wherein each of the plurality of code groups includes a unit sub matrix and an alpha matrix corresponding to the respective two sub data units.

20. The semiconductor memory device of claim 19, wherein each of the plurality of code groups includes a first sub code group and a second sub code group, and wherein each of the first sub code group and the second sub code group includes a half of the unit sub matrix and a half of the alpha matrix, and wherein the ECC encoder is configured to perform the first interleaved matrix-multiplication on the respective two sub data units, the first sub code group, and the second sub code group.

* * * * *